US012361499B2

(12) United States Patent
Even et al.

(10) Patent No.: US 12,361,499 B2
(45) Date of Patent: Jul. 15, 2025

(54) MACHINE LEARNING-BASED, PREDICTIVE, DIGITAL UNDERWRITING SYSTEM, DIGITAL PREDICTIVE PROCESS AND CORRESPONDING METHOD THEREOF

(71) Applicant: Swiss Reinsurance Company Ltd., Zürich (CH)

(72) Inventors: Yannick Even, Zürich (CH); Luca Baldassarre, Zürich (CH); Farooque Ahmed, Zürich (CH); Guan Wang, Zürich (CH)

(73) Assignee: Swiss Reinsurance Company Ltd., Zürich (CH)

( * ) Notice: Subject to any disclaimer, the term of this patent is extended or adjusted under 35 U.S.C. 154(b) by 135 days.

(21) Appl. No.: 18/239,982

(22) Filed: Aug. 30, 2023

(65) Prior Publication Data

US 2023/0410208 A1    Dec. 21, 2023

Related U.S. Application Data

(63) Continuation of application No. PCT/EP2022/068591, filed on Jul. 5, 2022.

(30) Foreign Application Priority Data

Jul. 5, 2021    (CH) .......................... CH070019/2021

(51) Int. Cl.
*G06Q 40/08*    (2012.01)
*G06N 5/022*    (2023.01)

(52) U.S. Cl.
CPC ............. *G06Q 40/08* (2013.01); *G06N 5/022* (2013.01)

(58) Field of Classification Search
CPC ............................... G06Q 40/08; G06N 5/022
See application file for complete search history.

(56) References Cited

U.S. PATENT DOCUMENTS

| 2019/0180379 | A1 | 6/2019 | Nayak et al. |
| 2019/0311438 | A1 | 10/2019 | Hibler et al. |
| 2022/0383322 | A1* | 12/2022 | Butvinik ................ G06N 20/20 |

OTHER PUBLICATIONS

International Search Report and Written Opinion issued Nov. 4, 2022 in PCT/EP2022/068591, 13 pages.
Anonymous, "Scikit-Learn: Machine Learning in Python", Internet Archive Wayback Machine, Feb. 28, 2019, pp. 1-3, XP055848164.

* cited by examiner

*Primary Examiner* — Elda G Milef
(74) *Attorney, Agent, or Firm* — Oblon, McClelland, Maier & Neustadt, L.L.P.

(57) ABSTRACT

Proposed is a ML-based, predictive, digital underwriting system and corresponding method providing an automated parameter-driven predictive underwriting process based on measured probability values associated with individuals of a cohort or portfolio, the individuals being exposed to a probability of occurrence of one or more predefined medical and/or health and/or life events having the probability value with a predefined severity within a future measuring time-window.

19 Claims, 17 Drawing Sheets

Model 1: Risk score and generated leads on existing customer data (SIO: 0.5, GIO: 0.75)

| | Reject | Reject | Reject | Reject | Reject | SIO | SIO | SIO | GIO | GIO |
|---|---|---|---|---|---|---|---|---|---|---|
| >= | 0 | 0.1 | 0.2 | 0.3 | 0.4 | 0.5 | 0.6 | 0.7 | 0.75 | 0.85 |
| < | 0.1 | 0.2 | 0.3 | 0.4 | 0.5 | 0.6 | 0.7 | 0.75 | 0.85 | 1 |
| Prop | 6% | 5% | 6% | 7% | 10% | 17% | 25% | 6% | 19% | 1% |
| Avg. Age | 49 | 46 | 44 | 42 | 40 | 39 | 37 | 36 | 38 | 42 |
| Avg. Prob of High Severity Claims | 44% | 56% | 48% | 34% | 17% | 4% | 0% | 0% | 0% | 0% |
| Duration Adjusted Loss Ratio | 91% | 89% | 81% | 65% | 50% | 44% | 34% | 29% | 24% | 19% |

Fig. 14

Model 2: Risk score and generated leads on existing customer data (SIO: 0.55, GIO: 0.77)

| | Reject | Reject | Reject | Reject | Reject | Reject | SIO | SIO | GIO | GIO |
|---|---|---|---|---|---|---|---|---|---|---|
| | >= 0 | >= 0.1 | >= 0.2 | >= 0.3 | >= 0.4 | >= 0.5 | >= 0.55 | >= 0.65 | >= 0.77 | >= 0.85 |
| | < 0.1 | < 0.2 | < 0.3 | < 0.4 | < 0.5 | < 0.55 | < 0.65 | < 0.77 | < 0.85 | < 1 |
| Prop | 3% | 4% | 5% | 7% | 8% | 8% | 17% | 30% | 16% | 2% |
| Avg. Age | 51 | 44 | 42 | 39 | 38 | 38 | 38 | 36 | 33 | 33 |
| Avg. Prob of High Severity Claims | 72% | 73% | 69% | 60% | 39% | 19% | 3% | 0% | 0% | 0% |
| Duration Adjusted Loss Ratio | 89% | 87% | 81% | 64% | 49% | 45% | 33% | 26% | 23% | 17% |

Fig. 15

MACHINE LEARNING-BASED, PREDICTIVE, DIGITAL UNDERWRITING SYSTEM, DIGITAL PREDICTIVE PROCESS AND CORRESPONDING METHOD THEREOF

CROSS REFERENCE TO RELATED APPLICATIONS

This application is a continuation of and claims benefit under 35 U.S.C. § 120 International Application No. PCT/EP2022/068591, filed Jul. 5, 2022, which is based upon and claims the benefit of priority from Swiss Application No. 070019/2021, filed Jul. 5, 2021, the entire contents of each of which are incorporated herein by reference.

FIELD OF THE INVENTION

The present invention relates to a Machine Learning (ML)-based, predictive, digital underwriting system, and more generally to automated decision-making systems. In particular, it relates to automated ML-based, predictive, digital underwriting systems providing an automated parameter-driven predictive underwriting process based on measured probability values associated with individuals of a cohort or portfolio, the individuals being exposed to a probability of occurrence of one or more predefined medical and/or health and/or life events having the probability value with a predefined severity within a future measuring time-window.

BACKGROUND OF THE INVENTION

Automated, digital life, health and/or medical UnderWriting (UW) systems belong to the technical field of automated decision-making systems which have been deployed in many industrial and technical applications. However, life, health and medical risk associated with the probability of the occurrence of a specific life, health and/or medical event to an individual of interest introduce additional technical problems and objects to realize beyond the challenges of automated decision-making systems. Automated life, health and medical prediction modelling structures that allow to quantitatively measure the risk of a medical, health and/or life event of interest to an individual are most commonly evaluated with respect to their capacity to discriminate between actual events and non-events. In the prior art, some systems use an assessment based on the receiver operating characteristic curve (AUC), sometimes in combination with citing sensitivity and specificity for one or more thresholds. Calibration is another important technical aspect of performance, albeit one that has received less attention. A model is said to be well calibrated if for every 100 individuals measuring a risk of x %, close to x have the actual event. Further, in the prior art systems, discrimination and calibration is typically insensitive to clinical consequences. The medical consequences of a false negative may be very different from those of a false positive.

Unseen the challenges induced by the medical background, the need for automated decision-making systems, as automated UW systems, are usually motivated by requirements for variation reduction, capacity increase, cost and cycle time reduction, and end-to-end traceability of, of for example, a processed product or an automated transaction. Further, before an automated decision-making system can be used in a production or other industrial environment, further a strategy to ensure high quality throughout its entire lifecycle needs to be developed, including bias mitigation and responsible use of data. Thus, its performance typically needs to be ensured through an appropriate adaption process which allows the system to react under changing environmental conditions. This process technically includes validation, tuning, and production testing of the system. Once the system is in operation its performance needs to be monitored and maintained over its lifecycle, including fairness and transparency assessment.

The technology used in automated decision systems comes from a broad base in the fields of computer technology and science. The information requirements and decision complexity handled by these techniques can vary widely depending on the application. Such applications can vary from common, repetitive automated transaction processing (such as an automated approval of purchases) to risk assessment and underwriting of complex risk-transfer structures and products. The selection of the supporting technologies depends on many factors, from pure data and information requirements (e.g. "Can the inputs be described in a metric space?"), to its output characteristics (e.g. "Is the output a discrete or continuous value?"), to technical design constraints and trade-offs that might prevent the use of specific technologies. Furthermore, the development of an automated decision engine typically is only the first step in a longer lifecycle process that covers the monitoring, updating, and maintenance of the automated operation of such engines.

In the development of any type of automated decision structure, the skilled person usually face several design trade-offs. Among the most common, there are: (1) accuracy versus coverage; (2) accuracy versus interpretability; (3) run-time efficiency versus configuration-driven architecture. Technically, these trade-offs are always present no matter what application of decision engine technology. In any phase of development, the technically skilled person based on the requirements of a specific application must be able to make the appropriate trade-off for that situation. This is particularly true for the construction of a process for an automated risk-transfer underwriting engine where each of these trade-offs needs to be determined and the application adapted accordingly based on predicted, simulated, or otherwise forecasted future occurrence frequencies of impacting events, which forecast is typically highly sensitive to kind of measured and/or captured historic data.

The first trade-off in automated decision making is similar to the precision versus recall balancing found in the technical design of data/information retrieval systems. A classifier can be tuned to maximize its number of correct decisions, declining the degree of reliability about the conclusion. This technically increases the measured accuracy at the expense of coverage. Alternatively, the same classifier can be tuned to always issue a decision for each probe, increasing coverage at the expense of accuracy.

The second trade-off, sometimes also dictated by external requirements as even non-technical legal or compliance requirements (but producing a technical impact), constrains the underlying technologies used to implement the classifier. In some approaches, soft computing (SC) techniques are used, i.e. comprising a collection of computational structures (probabilistic, fuzzy, neural, and evolutionary) in which the relation "model=structure+parameters" takes a different impact, since a much richer repertoire can be applied to represent the structure, to tune the parameters, and to iterate the automated process. Whatsoever, the technical person skilled in the art must somehow choose among different trade-offs between the model's interpretability, its fairness and its technical accuracy. For instance, one prior-art technical approach aiming at maintaining the modeling transparency starts by applying knowledge-derived linguistic modeling, in which domain knowledge is translated into an initial structure and parameters. The model's accuracy can then further be improved by using global or local data-driven or data-triggered search methods to tune the structure and/or parameters. An alternative prior-art approach aiming at building more accurate modeling structures, starts directly with data-driven search methods. Then, domain knowledge is embedded into the search operators to technically control or limit the search space, or to maintain the modeling processes' interpretability. Post-processing approaches are also sometimes used to extract explicit structural information from the modeling process. The third technical trade-off is related to the use of configuration adaptive files to drive the behavior of the classifiers, instead of hard-coding their logical behavior. The technical idea here is that the actual coded software implements a more generic approach structure to solving the problem, which then is specialized not within the code itself but by reading parameters from the adaptive configuration file. In fact, any external data source or real-world link, such as a database table or linked measuring or sensory devices, can be used to supply engine parameters, even by adapting them in real-time based on the real-world link. While slightly less efficient at run-time, the use of a common automated decision engine driven by adaptive configuration files produces a more maintainable classifier than one whose parametric values are intertwined in the engine's code. This additional computational cost can be justified for the purpose of lifecycle benefits.

The process of automated underwriting, in particular automated medical and/or health and/or life underwriting, in risk-transfer applications technically involves all the discussed technical key issues in developing and deploying an automated decision engine thus being representative of the technically challenging classification problem. Automated risk-transfer, i.e. insurance, underwriting is a complex technical decision-making task that is traditionally performed by trained individuals for these reasons. An underwriter must evaluate each risk-transfer application in terms of its potential risk for generating a claim, such as mortality in the case of term life insurance. Risk as understood within this application is a physical measurand providing a measure for an occurrence probability or occurrence frequency of a physically and measurably impacting defined physical event to a defined real-world object or individual, the impact having an associated level of damage in a defined future time-window to the real-world object or individual. The level of impact can also be represented or measured by monetary amount equivalents. By measuring the actual occurring events and/or impacts in said future time-window, the accuracy of the forecasted probability can be technically measured and verified, respectively. In the prior-art, a risk-transfer application is compared against standards developed by the insurance company, which are derived from actuarial principles related to mortality. Based on this comparison, the application is classified into one of the risk categories available for the type of risk-transfer requested by the applicant. The accept/reject decision is also part of this risk classification since risks above a certain tolerance level will typically be rejected. The estimated risk, in conjunction with other factors such as gender, age, and policy face value, will determine the appropriate price (premium) for the insurance policy. When all other factors are the same, to retain the fair value of expected return, higher risk entails higher premium.

Structured, parameter-based products, i.e. risk-transfer (insurance) application) are generally based on or structured using a closed, finite input parameter space with are typically predefined and hold in what is also called health and/or life risk-transfer (insurance) policies or applications.

A risk-transfer (insurance) application is represented it the present disclosure as an input vector $\overline{X}$ that contains a combination of discrete, continuous, and attribute variables and/or parameters. These variables represent the applicant's medical and demographic information/data that, in the prior art, typically has been identified by actuarial studies to be pertinent to the estimation of the applicant's claim risk measurand, i.e. the measurable probability for the occurrence of an impacting medial event to the applicant within a defined future time window. Similarly, within the present patent disclosure, the output space $\overline{Y}$, e.g. the underwriting decision parameter space, as an ordered list of rate classes. Due to the intrinsic difficulty of representing risk measurands as absolute real number on a scale, e.g. 97% of nominal mortality, the output space $\overline{Y}$ can also e.g. be subdivided into bins (rate classes) containing similar risk measurand values. For example 96-104% nominal mortality could be labeled the standard rate class. Therefore, within the present patent disclosure, the underwriting process is considered as a discrete classifier mapping an input vector $\overline{X}$ into a discrete decision space $\overline{Y}$, where $|\overline{X}|=n$ and $|\overline{Y}|=T$.

Providing automated technical solutions to this problem is not straightforward due to several technical requirements: (1) The underwriting mapping is highly nonlinear, since small incremental changes in one of the input components or measured input parameters can cause large changes in the corresponding rate class; (2) Most input measurands or parameters require interpretations to be usable in automated data processing. Underwriting standards cannot explicitly cover all possible variations of a risk-transfer application, causing ambiguity. Thus the underwriter's subjective judgment will almost always play a role in this process. Variations in factors such as underwriter training and experience will likely cause underwriters variability in their decisions; (3) These interpretations require an intrinsic amount of flexibility of the technical data processing structure to preserve a balance between risk tolerance, necessary to preserve price competitiveness, and risk-avoidance, necessary to prevent overexposure to assessed risk; and (4) Legal and compliance regulations typically have technical implications since they require that the modeling structures used to make the underwriting decisions be transparent, fair, interpretable, and provide a replicable operational accuracy.

To address these requirements, the UW decision structure can, inter alia, be extended by applying artificial intelligence (AI) or machine learning (ML) reasoning techniques, such as rule-based and case-based reasoning techniques, coupled with e.g. soft computing and data processing (SC) techniques, such as fuzzy logic and evolutionary processing structures. With such hybrid system, the herein proposed system is able to improve both flexibility and consistency of the inventive system, while maintaining interpretability and accuracy as part of the underwriting decision process and the digital risk-transfer management platform, as such.

It is to be noted that in the prior art risk-transfer technology of today, such electronic and/or digital automated UW processes become more and more important. There exist mobile applications, online websites, physical offices, call centers, and automated mail receival points all for the sale of risk-transfer options. However, there is no optimized, efficient, reliable, and automatable risk-transfer processing, digital channel which permitted an applicant to get a risk-transfer product at a point of sale of a retailer or the like for an amount of cover or cover for a predetermined premium payable at said point of purchase, for a risk category predetermined by the risk-transfer/insurance system and stated on the product. There is a need for new technology providing similar operation for risk-transfer UW to existing technologies such as digital in-store purchases of software or music subscription services that must be activated in order to function. The addition, such an electronic, fast efficient-to-implement risk-transfer UW channel would streamline the risk-transfer/insurance procurement process by integrating automated insurance technology into the fast-moving consumer goods sector, an area devoid of tangible financial service products.

In the prior art, US 2019/0180379 A1 discloses an automated fraud detection system for real-time detection of smoking patterns in an underwriting multi-level triage process, wherein the automated fraud detection system accesses a database stored in a memory to retrieve risk classes, identifies and selects a specific risk class associated with the risk of the exposed individual, processes specific parameters of the exposed individual using a machine learning-based pattern recognition to automatically assign risk-exposed individuals with detected non-smoking patterns to a second triage channel, and automatically assigning risk-exposed individuals with detected smoking patterns to a third triage channel as predicted smokers. Based on the classified risk, the system provides an alert notification to a third-party system. Further, the prior art document US 2019/0311438 A1 shows another automated underwriting system with implemented data science and machine learning structures to enable decision making and risk assessment. Data processing based on predictive analytics utilizing expanded datasets provides insightful data that is usable for insurance underwriting and provides actionable intelligence to stakeholders. Finally, the prior art document "scikit-learn: machine learning in Python" from the Internet Archive Wayback Machine pp. 1-3 discloses scikit-learn as a Python-based machine-learning structure and tool, as a tool usable for data mining and data analysis. The tool allows for classification, regression, clustering, dimensionality reduction and other preprocessing usable for data mining.

SUMMARY OF THE INVENTION

It is an object of the invention to allow for systematic capturing, measuring, quantifying, and forward-looking generating of appropriate medial risk measures for individuals and medial risk-transfer portfolios associated with risk exposures of physical real-world individuals based on physical measuring medial/clinical/diagnostic parameter values and data, i.e. the impact of a possibly occurring medical and physical event in a defined future time window to the respective individual. It is a further object of the present invention to develop an artificial intelligence (AI)/machine learning (ML) based automated electronic system to predict the medical and/or health and/or life underwriting risks for existing individuals based on extensive individual's attributes (historical claims, disclosures, demographics, policy information etc.). The digital system should allow for automatically honor Guaranteed Issue Offer (GIO)/Simplified Issue Offer (SIO) to eligible individuals according to their underwriting risk level (based on the predicted underwriting risk score). The invention should be able by applying a machine learning selection process to leverage on all individual attributes (demographics, claims, disclosures, financial, lifestyle and policy information etc.) without being required to restrict its measurement and assessment to parameter limitations. The system should also be able to capture and measure additional customers for the UW decision process, which should also include customers with no recent underwriting activity without having a decrease of measuring accuracy by the system. Finally, the system should be able to provide risk assessment measure based decision for GIO/SIO by providing an individual centered approach based on highly accurate measurements, instead of a selection criteria for each product/campaign (product centered), as the limitation of the prior art systems require. It is a further object of the present invention to propose a processor-driven system or platform providing an automated digital channel for automatically concluding and dynamically adapting risk-transfers between medical and/or health and/or life risk-exposed individuals and an automated digital system providing risk-transfer or risk-cover, which does not exhibit the disadvantages of the known systems. The invention should be enabled to provide an automated digital decision-making system for medial risks with high data quality and high measuring accuracy by, on the other hand, keeping computing efficient and processing consumption low, i.e. by technically optimizing the operational efficiency in respect to power and processing efficiency. The invention should allow to combine internal and external data sources. Further, it should help medial and/or health and/or life risk-exposed individuals better understand their medical and/or health and/or life risks, and allow for automated monitoring and applying of recommend mitigation actions in addition to medical and/or health and/or life risk-transfer covers. The invention should enable automated underwriting (UW) and pricing of risk-transfer covers with increased efficiency by (i) automatically providing base rates to support pricing of risk-transfers, (ii) using traditional and novel medical/clinical/diagnostic data sources and measuring methods/devices, and (iii) simplifying the quotation process by providing most accurate, explainable and fair measures.

According to the present invention, these objects are achieved, particularly, with the features of the independent claims. In addition, further advantageous embodiments can be derived from the dependent claims and the related descriptions.

According to the present invention, the above-mentioned objects for a ML-based, predictive, digital underwriting system providing an automated parameter-driven predictive underwriting process based on measured probability values associated with individuals of a cohort or portfolio, the individuals being exposed to a probability of occurrence of one or more predefined medical and/or health and/or life events having the probability value with a predefined severity within a future measuring time-window, are achieved, particularly, in that the ML-based, predictive, digital underwriting system comprises a data pre-processing engine providing pre-processed datasets of individuals measured or captured in the past, wherein a plurality of data sources are accessed by means of the data pre-processing engine via a data-interface capturing parameter values to each individual of the cohort or portfolio and assigning the parameter values to a corresponding data set associated with an individuals, and wherein the data set at least comprises measuring parameter related to demographic characteristics parameters and/or in-force risk-transfer characteristics parameters and/or claims characteristics parameters and/or UW process characteristics parameters and/or extended condition parameters, in that the ML-based, predictive, digital underwriting system comprises a risk-labelling engine comprising an unsupervised machine-learning (ML) structure for automated clustering the pre-processed datasets of individuals, the risk-labelling engine providing datasets of individuals segmented by clusters or segments by processing the pre-processed datasets of individuals by means of the unsupervised machine-learning (ML) structure, in that the ML-based, predictive, digital underwriting system comprises a supervised machine-learning (ML) structure for automated classification and/or validation of datasets of individuals based its associated cluster, where the learning phase of the supervised machine-learning (ML) structure comprises a feedback learning loop based on classified historical datasets of individuals, and in that the ML-based, predictive, digital underwriting system comprises an artificial-intelligence (AI) module with a supervised machine-learning structure trained during a training phase by supervised machine-learning, the AI-module generating in the application phase for each inputted dataset of an individual a risk score index as the measured occurrence probability value for the occurrence of one or more predefined medical and/or health and/or life events to the individual of the inputted dataset. The invention has, inter alia, the advantages that an AI/Machine Learning based system can be provided to predict the medical and/or health and/or life underwriting risk for existing customers based on extensive customer's attributes (historical claims, disclosures, demographics, policy information etc.). The system further allows to consider and automatically benefit Guaranteed Issue Offer (GIO)/Simplified Issue Offer (SIO) to individuals according to their underwriting risk level (based on the predicted underwriting risk score). Further, the technical use of a Machine Learning (ML) selection process, leveraging on all individuals attributes (demographics, claims, disclosures, and policy information), which is not given by prior art systems. Additional individuals considered for offers can e.g. also include individuals with no recent underwriting activity by keeping the same range of operational accuracy of the system. The system allows for a technically measured risk score electronically and automatedly triggered decisions, in particular also for GIO/SIO centered approaches, instead of a selection criteria for each product/campaign (product centered), for example, with mere thresholding. In contrast to the present invention, the prior art system only allows to provide GIO/SIO to only a limited segment of individuals based on (i) pre-defined business rules or selection criteria; and (ii) the recency of their last, fully-underwritten insurance policy purchase. The present invention does not have this disadvantages. Further, the prior art systems are only able to process limited information and/or measuring parameters, i.e. only small datasets for the individuals can be used by the prior art system to measure and assess each individual's underwriting risk, i.e. its measurable probability for the occurrence (thus, the frequency of the occurrence) for pre-defined medical and/or health and/or life events having a measurable impact on the individual with in a definable future time window to be measured. It is to be mentioned, that though the impact is a physical impact on the individual which is measurable by an amendment by the clinic/diagnostic parameter values of the individual, the impact can also be measured by a more abstract measure allowing to provide a measure for different impacts of different medical events/illnesses/accidents. Such an abstract measure can e.g. also be monetary-based measure associated with the medical or other treatment needed to overcome the impact just giving an abstract measure for a possible loss to the individual.

According to an embodiment variant the data set at least comprising measuring parameter related to demographic characteristics parameters and/or in-force risk-transfer characteristics parameters and/or claims characteristics parameters and/or UW process characteristics parameters and/or extended condition parameters can, for example, be specifically technically optimized to fit best the machine-learning structures and data processing of the ML-based, predictive, digital underwriting system. In particular, demographic characteristics parameters can e.g. comprise at least an occupation class value and/or a height value and/or a weight value and/or a gender value and/or a smoking status value and/or an education indication value and/or a date of birth (DOB) value and/or a race indication value and/or a nationality indication value and/or a marital status value and/or a number of children and/or occupation (sub-)classes level 1 value provided by industry code mapping and/or an issue date and/or an annual income value and/or location value comprising geo-coding data or address data and/or payment frequency and/or payment method indication data. The in-force risk-transfer characteristics parameters can e.g. comprise at least risk-transfer characteristics parameters and/or contact date and/or time and/or APE (Annual Premium Equivalent) and/or existing UW decision parameters and/or total in-force annualized premium earned (APE) and/or length of relationship and/or last risk-transfer date and/or number of in-forced/lapsed risk-transfers. The existing UW decision parameters can e.g. comprise at least standard UW decision parameters and/or substandard UW decision parameters and/or rejected UW decision parameters and/or exclusion UW decision parameters. The claims characteristics parameters can e.g. comprise at least an incur data value and/or a settle date value and/or a claim type and/or an amount value and/or a frequency and/or disease diagnosis data and/or IDC-10 code (International Statistical Classification of Diseases and Related Health Problems) and/or diagnosis data associated with a medical and/or health and/or life claim and/or impairment code and/or benefit breakdown data. The UW process characteristics parameters can e.g. comprise at least a sum value assured and/or a term value of the risk-transfer and/or health characteristics data and/or medical cover parameter and/or past and recent UW decision parameters and/or personal disclosure data. The extended condition parameters can e.g. comprise at least agent channel parameters and/or loyalty program parameters and/or bank transaction parameters and/or wearable telematics data. The agent channel parameters can e.g. comprise at least agency type and/or agency rating and/or agent area characteristics and/or education level and/or education rank and/or tenure parameters and/or persistence parameters. The loyalty program parameters can e.g. comprise at least joint data and/or number of activities and/or number reward points earned and/or customer tier parameters. The bank transaction parameters can e.g. comprise at least credit card transactions parameters and/or standard industry code of merchant. The wearable telematics data can e.g. comprise at least log in/out time and/or activities and/or body characteristics data during/between activities.

In an embodiment variant, the unsupervised machine-learning (ML) structure can e.g. comprise at least a K-means and/or mini-batch K-means machine-learning (ML) structure. The K-means machine-learning (ML) structure can e.g. use a vector quantization method partitioning the measured and pre-processed datasets of individuals into a number k of clusters where each measured and pre-processed dataset of individuals is associated with the cluster having the nearest means to its cluster center or to its cluster centroid which serves as a prototype of said cluster. The embodiment variant with the standard K-means machine-learning structure has, inter alia, the advantage that the clustering using the K-means structure, technically proves its good time performance. However, with the increasing size of the datasets of the individuals being processed and analyzed, this ML structure is losing its technical attractive because its constraint of needing the whole dataset in main memory. In the present technical problem, for example, a modification can be used in how is processed the assignment of examples to cluster prototypes using a triangular inequality. This method effectively reduces the number of distance computations each iteration, however, maintains the need of having all the dataset of the individuals in memory. Other strategies can e.g. be used to reduce the amount of data needed to update the cluster centroids each iteration by selecting random samples of the datasets of individuals, by summarizing examples using sufficient statistics and by discarding examples that have a small impact on the clusters. However, as a preferred technical solution to solve this technical problem with large amounts of datasets of individuals, a mini-batch K-means machine-learning (ML) structure can e.g. be used as an alternative to the K-means structure for clustering of massive datasets of individuals and, thus, to reduce the temporal and spatial cost introduced by applying this ML-structure for clustering. Therefore, as a variant, the K-means machine-learning (ML) structure can e.g. be based on a mini-batch K-means structure, the mini-batch K-means structure using small, random, fixed-size batches of the pre-processed dataset of individuals ($2, 21, 22, \ldots, 2i$) to store in memory, and then collecting with each iteration, a random sample of the pre-processed dataset of individuals used to update the clusters. The advantage of applying the mini-batch K-means ML-structure is to reduce the computational cost by not using all the dataset of the individuals each iteration but a subsample of a fixed size, in particular, since a dataset of an individual can comprise a large range of parameter values. This strategy reduces the number of distance computations per iteration at the cost of lower cluster quality. The purpose of this paper is to perform empirical experiments using artificial datasets with controlled characteristics to assess how much cluster quality is lost when applying this structure. The goal is to obtain some guidelines about what the best circumstances are to apply this structure and what is the maximum gain in computational time without compromising the overall quality of the partition. As mentioned, the mini batch K-means structure is an alternative approach. The idea, proposed here, is to use small random batches of examples of the datasets of individuals of a fixed size so they can be stored in memory. Each iteration a new random sample from the datasets of individuals is obtained and used to update the clusters and this is repeated until convergence, e.g. by thresholding the convergence to a predefined value. Each mini batch updates the clusters using a convex combination of the values of the prototypes and the examples, applying a learning rate that decreases with the number of iterations. This learning rate is the inverse of number of examples assigned to a cluster during the process. As the number of iterations increases, the effect of new examples is reduced, so convergence can be detected by the system when no changes in the clusters occur in several consecutive iterations. A detailed structure is presented below.

As an embodiment variant, the mini-batch K-means clustering can e.g. be realized based on Python. This embodiment variant has, inter alia, the technical advantage that due to Python's focus on simplicity and readability, it allows to boast a gradual and relatively low learning curve for the present application. Python offers for the present invention further the advantage of using fewer lines of code to accomplish tasks than one needs when using other languages for implementation. Further, Python show good results in Enterprise Application Integration (EAI). Since, Python is highly embeddable in applications, even those implemented by other programming languages. Thus, it allows for easy integration with other languages, thereby making the web development process easier. For instance, it can invoke CORBA/COM components and also directly calling from and to Java, C++ or C code. Python's strong integration bonding with Java, C, and C++ may have additional advantages for realizing the present invention if for the realization of the system application scripting is used.

In even a further embodiment variant, the extracted clusters or segments can e.g. be automatically classified by a supervised machine-learning structure or by pattern recognition based on historically measured and validated datasets. Alternatively, for automated classification and/or validation of datasets of individuals, the clusters/segments are validated by providing a feedback loop to at least one human expert based on historically measured and validated datasets by means of a data interface of the system. For both alternative embodiment variants, the historically measured and validated datasets can e.g. comprise at least data indicating an underwriting decision and/or a claim severity and/or a loss ratio.

In an embodiment variant, the system can e.g. be calibrated to a predefined overall threshold value wherein the measured risk score index values and/or a measured distribution of the measured risk score index values is adjusted to a predefined value range given by the overall threshold value. The overall threshold value can e.g. be given or can e.g. represent the risk appetite as maximum value of possibly to be covered risks by a risk-transfer system and/or by a specific portfolio comprising a plurality of selected risk-transfers. A measured performance of an automated risk-transfer system can e.g. be automatedly adapted by adjusting and/or calibrating the system by measuring a business impact of an error caused by the AI-module to the automated risk-transfer system.

BRIEF DESCRIPTION OF THE DRAWINGS

The present invention will be explained in more detail, by way of example, with reference to the drawings in which:

FIG. 3 illustrates the embodiment variant with the human-based feedback loop for the validation of the clusters 1212. The process comprises data capturing/measuring and pre-processing 91 (not shown in FIG. 3), risk labelling 92 with risk segmentation/clustering 921 and cluster validation 922, modelling/forecasting/prediction 93 with ML-structure training 931 and system calibration 932, and trigger signal generation and transmission to associated automated systems (e.g. warning/alarm/decision making systems) 94 (not shown in FIG. 3).

FIG. 4 illustrates the relationship between them.

FIG. 5 illustrates the embodiment variant with the human-based feedback loop for the validation of the clusters 1212.

FIG. 6 is a plot of the result from the elbow method, where 70 is used as the number of clusters 1212.

FIG. 12 illustrates the performance by generating the appropriate confusion matrix.

FIGS. 14 and 15 show diagrams schematically illustrating the measured risk score values under applying model 1 and model 2 structures to the datasets 102 of the individuals 2.

DETAILED DESCRIPTION OF THE PREFERRED EMBODIMENTS

Figure 1:
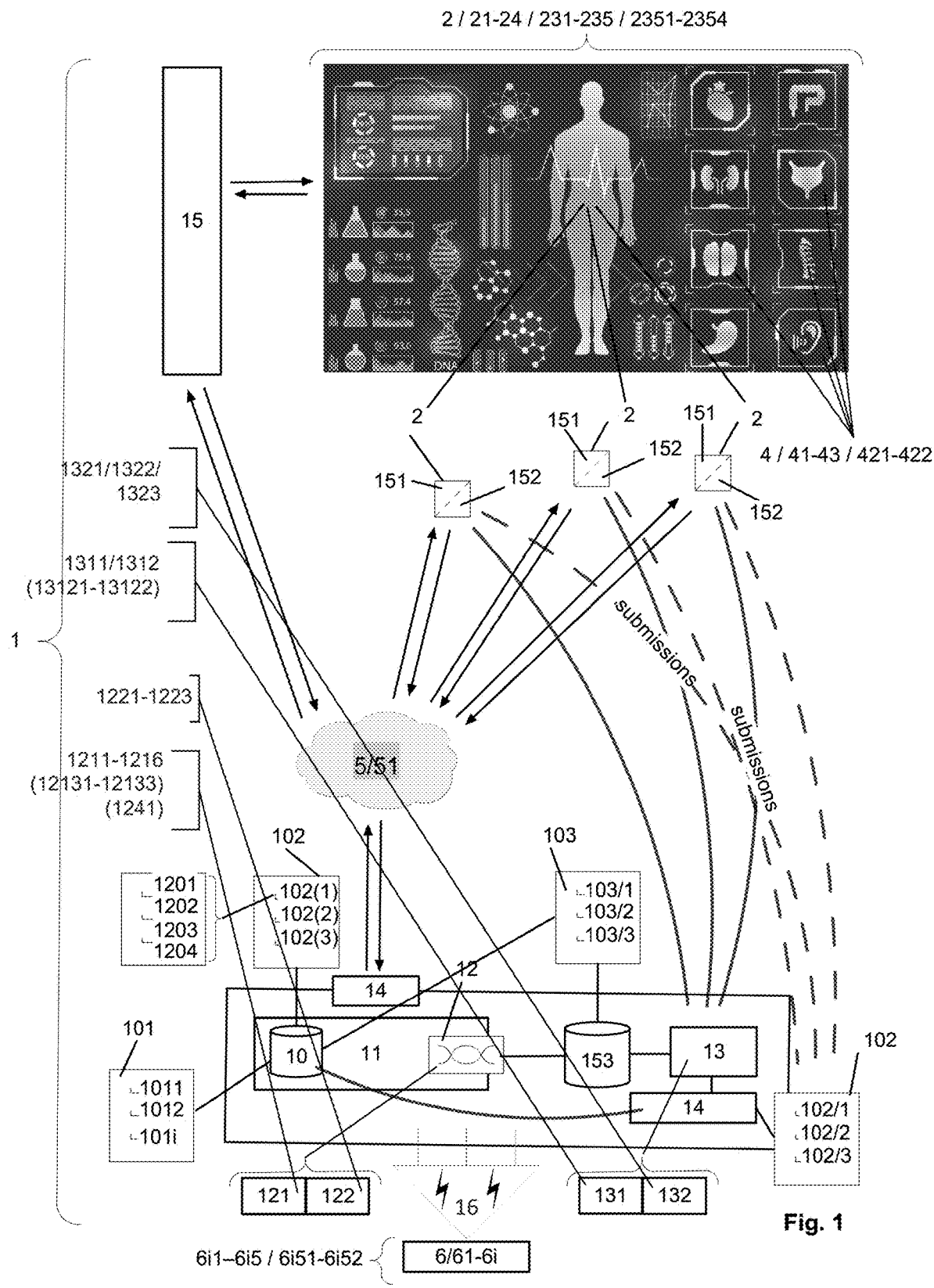
FIG. 1 shows a block diagram schematically illustrating an exemplary ML-based, predictive, digital underwriting system 1 providing an automated parameter-driven predictive underwriting process 9 based on measured probability values 22 associated with individuals 2 of a cohort 21 or portfolio 1011, the individuals 2 being exposed to a probability of occurrence of one or more predefined medical and/or health and/or life events 4 having the probability value 22 with a predefined severity 41 within a future measuring time-window 42.
Figure 2:
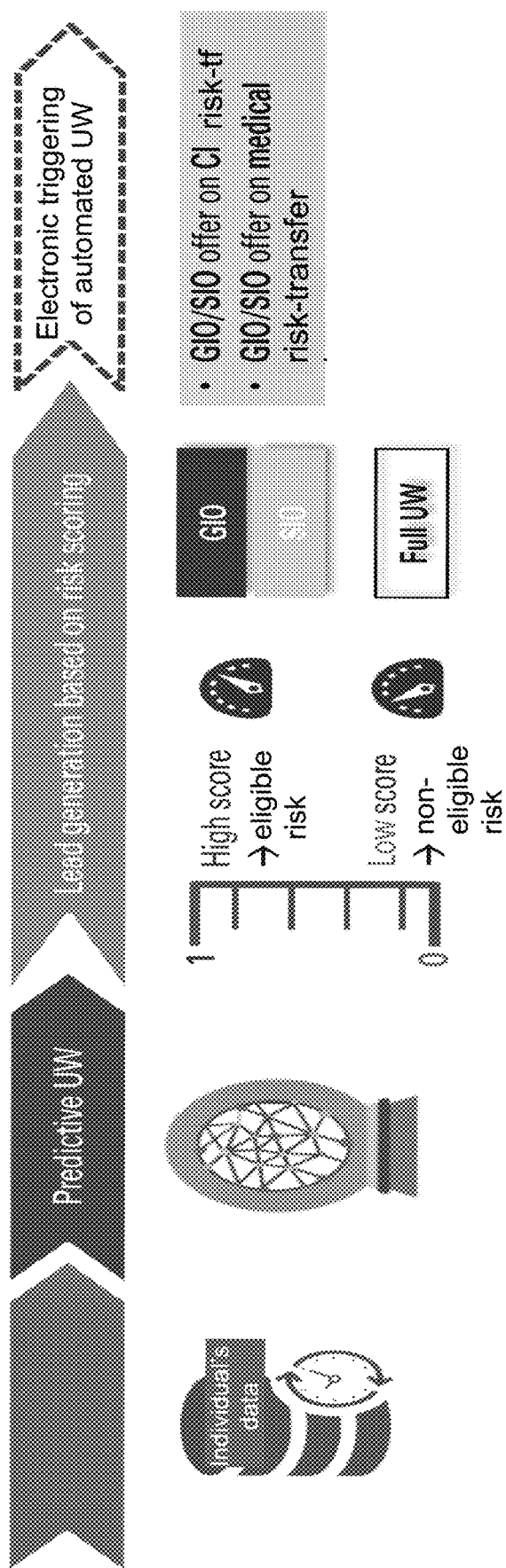
FIG. 2 shows a diagram schematically illustrating the technical data flow and data processing pipeline. The inventive automated, predictive UW system 1, inter alia, allows to automatically identify and enhance risk-related measures and generate a more accurate trigger signaling for indicate automated GIO/SIO underwriting, thereby increasing the operational efficiency and consumption of the system 1.
Figure 3:
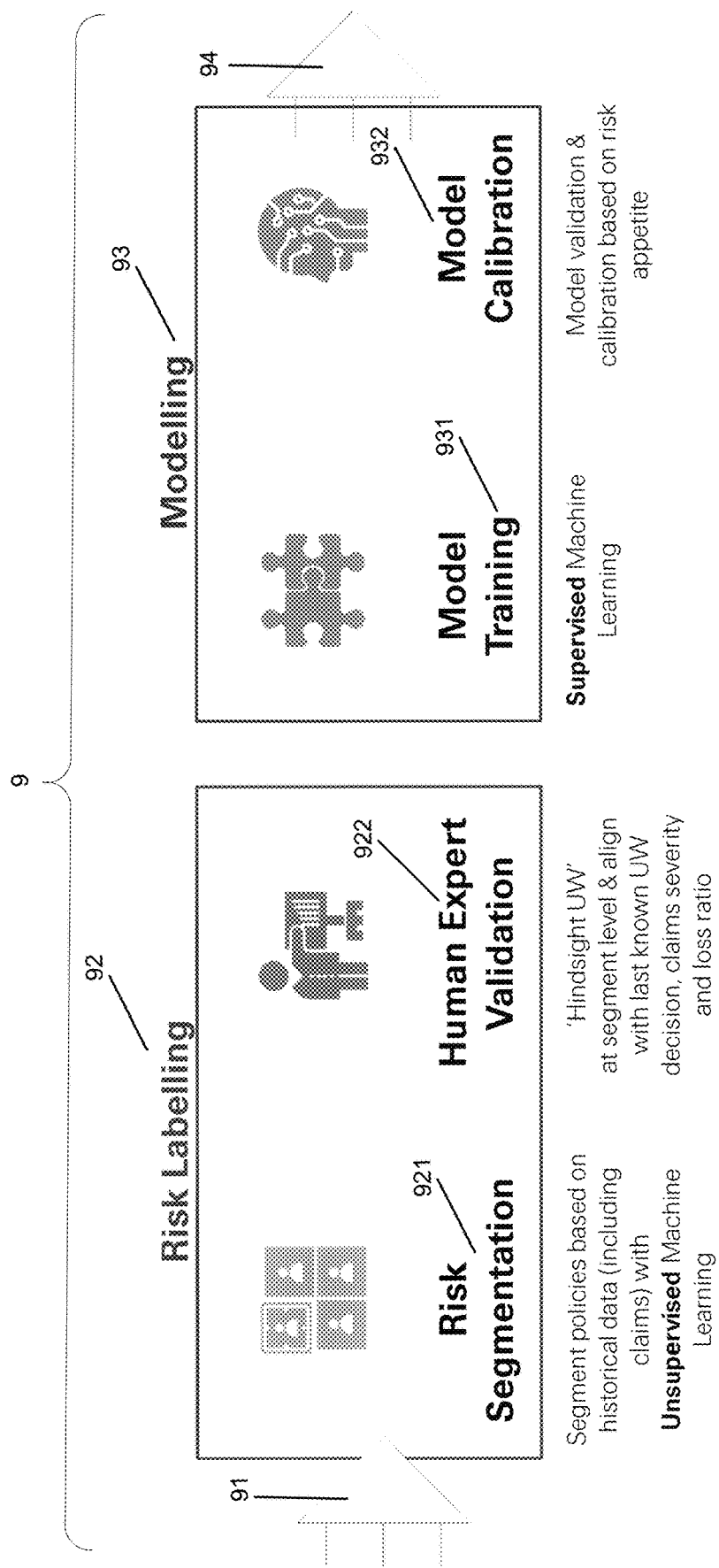
FIG. 3 shows a diagram schematically illustrating an exemplary technical data flow and data processing pipeline of the inventive automated parameter-driven predictive underwriting process 9. However.

FIG. 1 schematically illustrates an architecture for a possible implementation of an embodiment the machine-learning (ML)-based, predictive, digital underwriting system 1. The system 1 provides an automated parameter-driven predictive underwriting process 9 based on measured probability values 22 associated with individuals 2 of a cohort 21 or portfolio 1011, wherein the individuals 2 are exposed to a probability of occurrence of one or more predefined medical and/or health and/or life events 4 having the probability value 22 with a predefined severity 41 within a future measuring time-window 42.

The ML-based, predictive, digital underwriting system 1 comprises a data pre-processing engine 11. The data pre-processing engine 11 provides pre-processed datasets 111 of individuals 2 exposed to said medical and/or health and/or life events 4 measured or captured in a past measuring time window 42. A plurality of data sources 15 are accessed by means of the data pre-processing engine 11 via a data-interface 14 capturing parameter values 23 to each individual 2 of the cohort 21 or portfolio 1011 and assigning the parameter values 23 to a corresponding data set 102 associated with an individual 2. The data set 102 at least comprises measuring parameter related to demographic characteristics parameters 231 and/or in-force risk-transfer characteristics parameters 232 and/or claims characteristics parameters 233 and/or UW process characteristics parameters 234 and/or extended condition parameters 235. The demographic characteristics parameters 231 can e.g. at least comprise an occupation class value and/or a height value and/or a weight value and/or a gender value and/or a smoking status value and/or an education indication value and/or a date of birth (DOB) value and/or a race indication value and/or a nationality indication value and/or a marital status value and/or a number of children and/or occupation (sub-) classes level 1 value provided by industry code mapping and/or an issue date and/or an annual income value and/or location value comprising geo-coding data or address data and/or payment frequency and/or payment method indication data. The in-force risk-transfer characteristics parameters 232 can e.g. at least comprise risk-transfer characteristics parameters and/or contact date and/or time and/or APE (Annual Premium Equivalent) and/or existing UW decision parameters and/or total in-force annualized premium earned (APE) and/or length of relationship and/or last risk-transfer date and/or number of inforced/lapsed risk-transfers. The existing UW decision parameters can e.g.

at least comprise standard UW decision parameters and/or substandard UW decision parameters and/or rejected UW decision parameters and/or exclusion UW decision parameters. The claims characteristics parameters 233 can e.g. at least comprise an incur data value and/or a settle date value and/or a claim type and/or an amount value and/or a frequency and/or disease diagnosis data and/or IDC-10 code (International Statistical Classification of Diseases and Related Health Problems) and/or diagnosis data associated with a medical and/or health and/or life claim and/or impairment code and/or benefit breakdown data. The UW process characteristics parameters 234 can e.g. at least comprise a sum value assured and/or a term value of the risk-transfer and/or health characteristics data and/or medical cover parameter and/or past and recent UW decision parameters and/or personal disclosure data. The extended condition parameters 235 can e.g. at least comprise agent channel parameters 2351 and/or loyalty program parameters 2352 and/or bank transaction parameters 2353 and/or wearable telematics parameters 2354. The agent channel parameters 2351 can e.g. at least comprise agency type and/or agency rating and/or agent area characteristics and/or education level and/or education rank and/or tenure parameters and/or persistence parameters. The loyalty program parameters 2352 can e.g. at least comprise joint data and/or number of activities and/or number reward points earned and/or customer tier parameters. The bank transaction parameters 2353 can e.g. at least comprise credit card transactions parameters and/or standard industry code of merchant. The wearable telematics parameters 2354 can e.g. at least comprise log in/out time and/or activities and/or body characteristics data during/between activities.

There are three most important things for a machine learning project: data, data, and data. Such automated system 1 need data and need good data. This brings to the following data qualities: (1) Large dataset; (2) Wide range of feature set. In the present case, features can e.g. be used from demographics data, underwriting data, and health claim data. Ideally more features like social network, fitness data etc. can be added in and this will be a unique advantage of machine learning models compared to traditional UW dataset; and (3) Enough label data. This can be the tricky risk labels are needed on existing policyholder to teach the system 1 to calculate the risk score for new individuals.

It is to be noted for the present data pre-processing, that the data accessed typically can e.g. comprise (apart from the risk mitigation related data) large sets of electronic health data and/or records describing individuals with clinical and/or medical and/or diagnostic parameter values. Each record can e.g. be in a certain format as an XML file that includes medical observations, test results and reports compiled and maintained by medical equipment operated by medical doctors and/or nurses. Specifics of time series of medical parameters is that they are usually inconsistent, sparse, and heterogeneous, have varying lengths and irregular sampling intervals. Apart from this, different parameters of the dataset have vastly varying population, which poses additional challenges. There are also issues specific when the data is used by machine learning methods. For instance, some parameters can be measured only for individuals who were treated successfully, and other parameters—only for individuals who passed away. Such features are examples of parameters that are often impossible to use with classification methods.

Looking at the properties of the datasets 102, for example, it can be the case that the majority of parameters were measured in a small number of individuals 2 and, for example, just a few times over the treatment history of an individual 2 (low number of samples per time series). However, typically there is also a group of parameters having both significant number of individuals 2 and relatively long time series. For the present inventive system, it can be preferable to pick the features having both significant number of individuals 2 and long time series 1204. Out of the large range of different parameters, for example, a limited set of medical and/or health and/or medical features can be selected by the technically skilled person for the ML-based structures, which, for example, can comprise platelet distribution width, mean platelet volume, mean red blood cells volume, glucose concentration, red blood cells, monocytes, lymphocytes, mean hemoglobin per red blood cell concentration, white blood cells, platelets, creatinine concentration, hemoglobin concentration, mean hemoglobin per red blood cell, red blood cells distribution width, hematocrit, and neutrophils. The data can e.g. be filtered so it contains only individuals 2 having measurements of all these selected parameters. Thus, the data sources 15 as integrated part of the system 1 can e.g. further comprise at least laboratory/clinical/medical measuring devices 151 and/or diagnostic tools 152 and/or medical/clinical databases 153 transferring their measuring parameter values by electronic signal transfer via the data interface 14. The laboratory and/or clinical and/or medical measuring devices and/or sensors 151 can e.g. at least comprise measuring devices or sensors measuring or sensing platelet distribution width and/or mean platelet volume and/or mean red blood cells volume and/or glucose concentration and/or red blood cells and/or monocytes, lymphocytes and/or mean hemoglobin per red blood cell concentration and/or white blood cells and/or platelets and/or creatinine concentration and/or hemoglobin concentration and/or mean hemoglobin per red blood cell and/or red blood cells distribution width and/or hematocrit, and/or neutrophils.

In order to overcome the problems of medical and UW time series measured in the past, i.e. historical datasets 102, such as sampling inconsistency and varying length, the pre-processing can e.g. be based on different approaches. For example, the captured and/or measured time series data can be transformed into a new latent space using the hyperparameters of a Multi-Task Gaussian Process (MTGP) structure. Another possibility is to apply a STF-Mine structure (Segmented Time series Feature Mine) to collapse multivariate time series data into automatically generated temporal features for classification using frequent pattern mining method. To fill out the missing values also e.g. Regularized Expectation Maximization structure can be used. The captured and/or measured time series data can e.g. be resampled over regular intervals (e.g. a defined time windows (days/weeks etc.) or terms of risk-transfers etc.) using linear interpolation for the points that are within the original sampling boundaries and extrapolate by a nearest neighbor when a new point is outside. Time values of the series can e.g. be recalculated as their offsets from the last measurement. In addition, all the measurements can e.g. be normalized by median of the parameter they belong to. As a result, each individual 2 can e.g. be represented by a combination of a defined number of regularly sampled time series having equal lengths. As discussed below, there are different approaches to applying the ML-based clustering structures to the time series data. For example, it is possible to perform clustering to the values at each moment in the time series and investigate the dynamics, or develop some novel representation for such data. For the present system 1, the performance of the ML-based structures can e.g. be measured on the binned vector values on various time intervals. This can e.g. comprise analysis of dynamics of centroids and standard deviations for cohorts 21 of individuals 2 (critical and normal) on the defined time intervals.

The ML-based, predictive, digital underwriting system 1 comprises a risk-labelling engine 12 comprising an unsupervised machine-learning (ML) structure 121 for automated clustering the pre-processed datasets 111 of individuals 2. The risk-labelling engine 12 provides datasets 1211 of individuals 2 segmented by clusters 1212 or segments 1212 by processing the pre-processed datasets 111 of individuals 2 by means of the unsupervised machine-learning (ML) structure 121. The unsupervised machine-learning (ML) structure 121 can e.g. at least comprise a K-means 1213 and/or mini-batch K-means 1214 machine-learning (ML) structure. For signal processing, the K-means machine-learning (ML) structure 1213 can e.g. use a vector quantization process 12131 partitioning the measured and pre-processed datasets 111 of individuals 2 into a number k of clusters 1212, where each measured and pre-processed dataset 111 of individuals 2 is associated with the cluster 1212 having the nearest means 12132 to its cluster center 12133 or to its cluster centroid 12133 which serves as a prototype of said cluster 1212. For signal processing, the unsupervised machine-learning (ML) structure 121 can e.g. be based on a mini-batch K-means structure 1214, the mini-batch K-means structure 1214 using small, random, fixed-size batches 12141 of the pre-processed dataset of individuals 2 to store in memory 10, and then collecting with each iteration, a random sample 12141 of the pre-processed dataset 111 of individuals 2 used to update the clusters 1212. The mini-batch K-means 1214 or K-means 1213 machine-learning (ML) structure can e.g. be realized based on Python.

It is to be noted that K-means 1213 is a centroid-based clustering structure. It requires setting the number of clusters (K) beforehand. After initializing the centers of K clusters (initialization method depends on implementation), the structure determines the closest center for each point and assigns this point to respective cluster. Then, cluster centers get recalculated as centroids of all the points belonging to the respective cluster. The structure keeps iterating until cluster centers converge or iteration limit is reached. The parameters of the ML-based structure 121, described in the following, are the center initialization and iteration limit parameters. As further described below, the system 1 comprises a K-means machine-learning (ML) structure 1213 ora mini-batch K-means machine-learning (ML) structure 1214 to speed up convergence for the present application using an array of defined cluster centers.

As a variant, the K-means machine-learning (ML) structure 1213 can e.g. further also be combined with density-based spatial clustering of applications with noise (DBSCAN) clustering structure 1215 to achieve an effective outliners 1216 clustering. The density-based spatial clustering of applications with noise (DBSCAN) structure 1215 is a density-based clustering structure. For each point in a given dataset 102, a set of neighboring points are determined that are within a specified distance (epsilon). If the number of these core points is higher than a specified threshold, then initial point becomes a new core point (a cluster 1212 is started), otherwise the point is marked as an outlier. When a cluster 1212 is started, sufficiently big neighborhoods of each neighbor are added to this cluster 1212. Datasets 102 are processed by the structure until all the points are either in a cluster 1212 or outliers. The parameters defining the performance of the ML-based structure are epsilon, minimum samples in a neighborhood to start (or to be added to) a cluster, and the function to generate distance between points. For example, a Euclidean metric can be selected to generate the distance between points. Thus, to perform outlier clustering, first the DBSCAN structure 1215 can e.g. be applied with parameter values specified during the sensitivity analysis to detect outliers. Then, clusters 1212 can e.g. be filtered out by the system 1 and the clustering of outliers can be processed by the system 1 alone. For this, only two or three factors of the datasets 102 can e.g. be selected and used to measure the best clustering performance and only the last measurements data.

Figure 4:
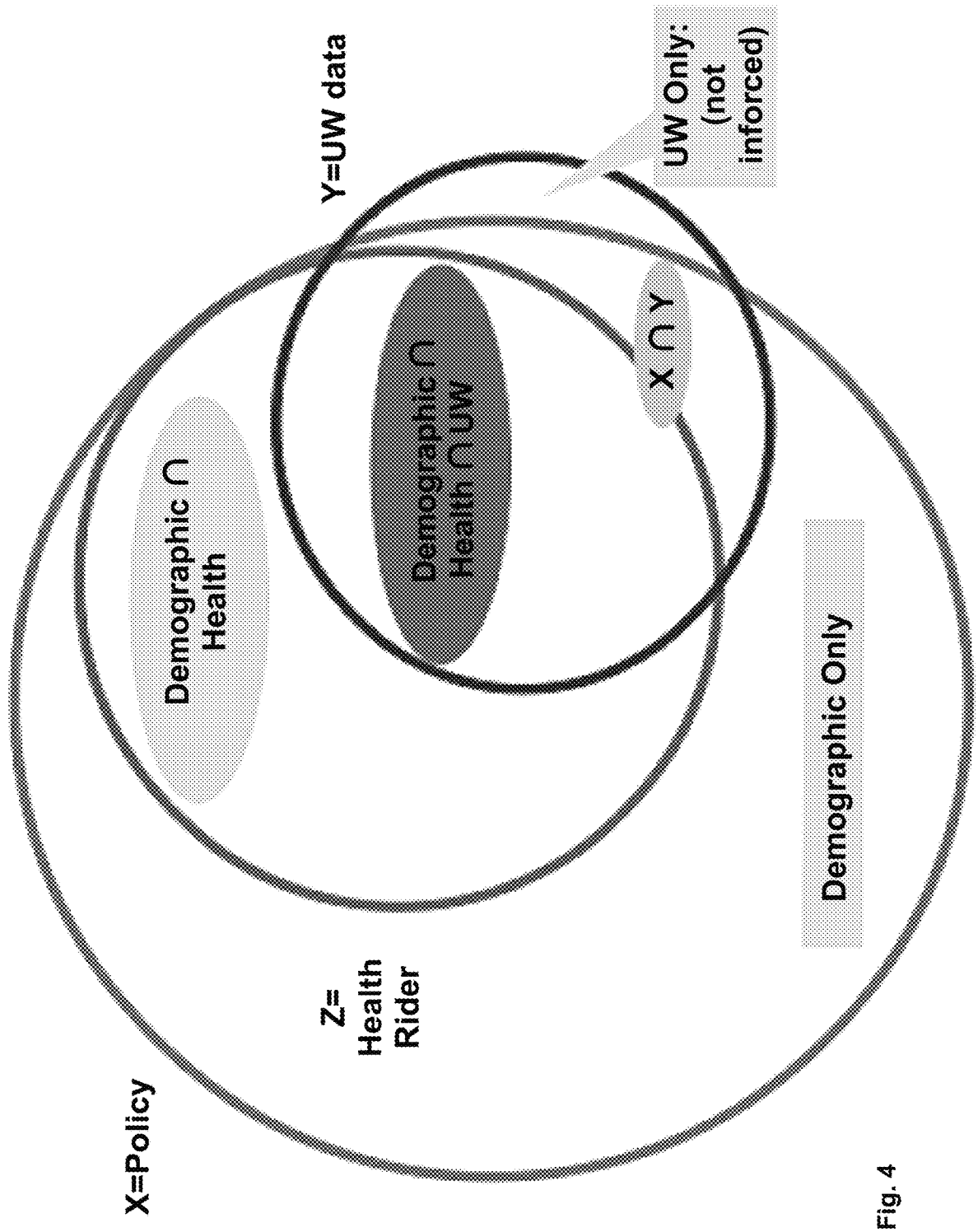
FIG. 4 shows a diagram schematically illustrating that historical UW and/or medical data and datasets 102, inter alia because of legacy issues, are typically stored in different formats at different places. It's an important first step to understand the data which can be assessed by the system 1 via the data interface 14 from the data sources 15. In the present case, demographic features, underwriting features and claim features from health rider data can e.g. be from different databases and measuring facilities.
Figure 5:
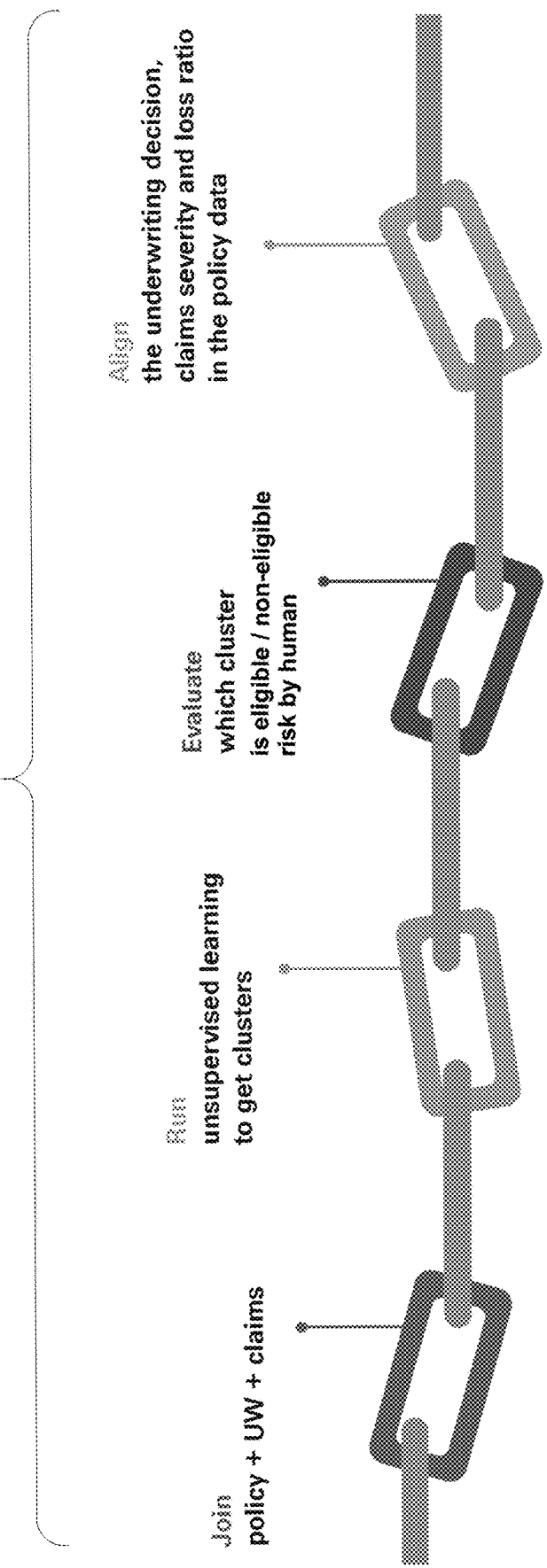
FIG. 5 shows a diagram schematically illustrating an exemplary technical data flow and data processing pipeline of the inventive risk labelling process 92 However.

In addition, historical UW and/or medical and/or health and/or medical data and dataset 102, inter alia because of legacy issues, are stored in different formats at different places. It's an important first step to understand the data which can be assessed by the system 1 via the data interface 14 from the data sources 15. In the present case, demographic features, underwriting features and claim features from health rider data can e.g. be from different databases and measuring facilities. FIG. 4 illustrates the relationship between them. To clarify, a "policy" or "risk-transfer" refers to a base policy or risk-transfer where the benefit is not medical (could be death). Having claims data from the base policy doesn't make sense as the data will be too sparse. Hence, the inventive system 1 uses the "health rider" which is actually a medical reimbursement rider where much more claims' data can be captured by the system 1, as multiple claims can be made under a single rider, and the rider continues to be in force as long as the life assured is still alive and continues to renew the policy.

It is important to understand what part of the data will be used as training data with possible labels, and what part of the data can be used as the potential individual 2 base for the model to predict on. The present inventive system 1 can e.g. be based on three modelling structures: Model 1: With full feature set of Demographic+UW+Health (Claim); Model 2: With feature set of only Demographic+Health (Claim); and Model 3: With feature set of only Demographic. However, other combinations of data input parameters are also imaginable. From Model 1 to Model 3, as more and more features are missing, the expected system 1 performance will decrease, however the system 1 will also cover larger individual base when it comes to measurement and prediction of the risk scores parameter values. It's also important to distinguish between the training data and prediction data here. While individual base data for prediction is different, the same set of base training data can e.g. be used with labels for all the 3 modelling structures. The difference between the 3 models is then only on the feature set, i.e. the dataset 102, selected during the training process.

Regarding the risk labelling process 92 by the risk-labelling engine 12, to get the best label quality, the label data can e.g. be generated from full feature set, namely demographic 231, underwriting 232/234 and claim feature parameters 233.

The labels, namely the risk label on each individual 2, can e.g. be generated by applying appropriate rules, i.e. rule-based. In the inventive system 1, the rules for deciding on a non-eligible risk case can e.g. be realized the following (with respect to the split on time dimension which is discussed below later): (1) Previous underwriting decision on the customer is substandard; (2) Previous claimed disease from this customer is ranked as high severity level; and (3) Loss ratio (claim amount over premium) on the customer is bigger than a certain level.

Figure 6:
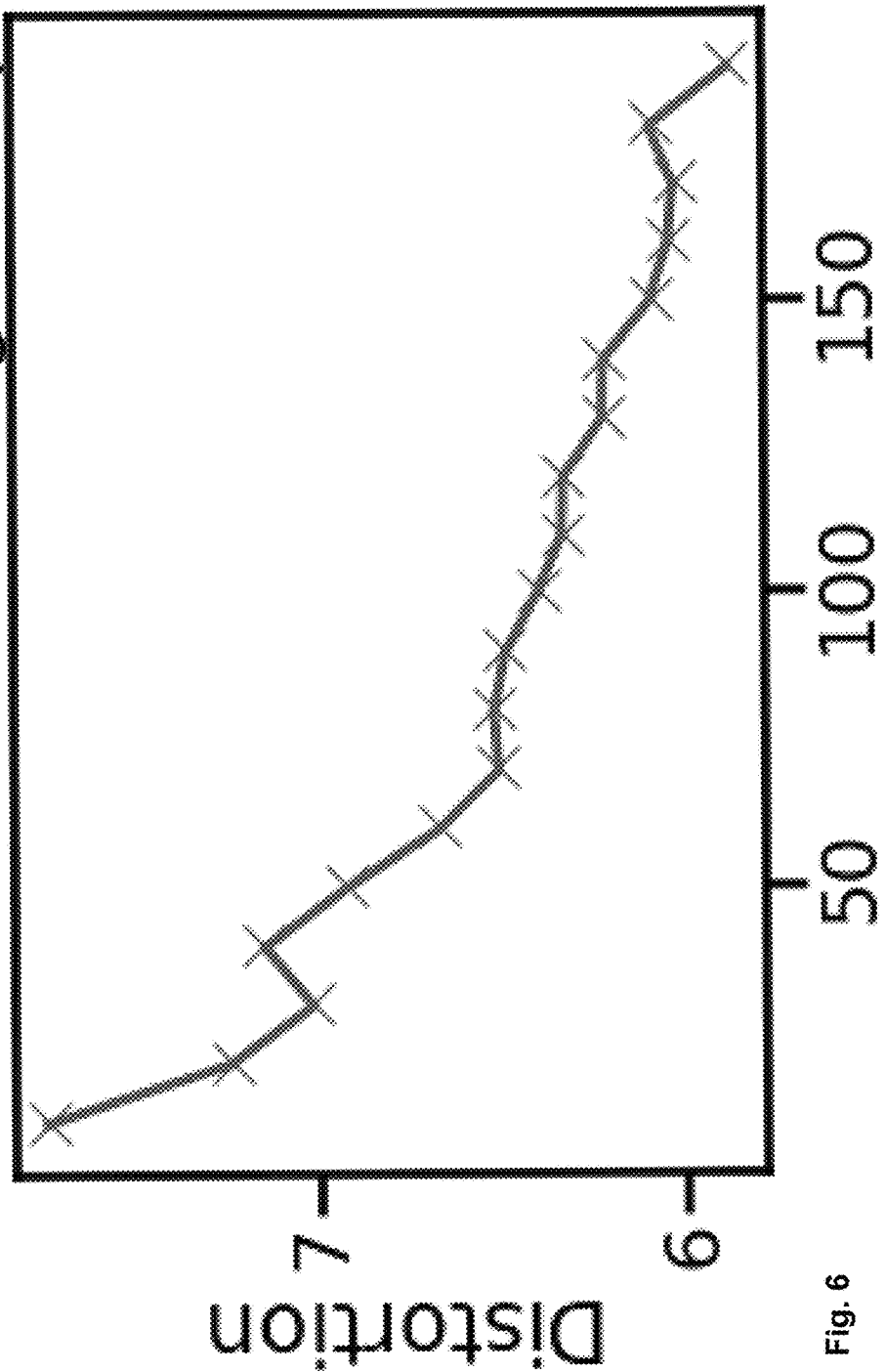
FIG. 6 shows a diagram schematically illustrating clustering the individuals 2 into a comfortable number of clusters 1212. A K-means structure 1213 can e.g. be used as a parameter-clustering structure. In particular, a mini-batch K-means structure 1214 is used to cope with the large numbers of datasets 102 within limited computational resource or to optimize the computational consumption. Further, the elbow method can be used to decide on the number of clusters 1212.

Besides the rules, it is also possible to introduce as much as possible of the experience of underwriters into the labelling process. Ideally, the underwriters, i.e. the automated risk-transfer systems 6 should label each of the individuals 2 again by looking at all the features, and with millions of policyholders, i.e. individuals 2 of a portfolio 6i3, this becomes technically unpractical. Thus, the inventive unsupervised learning/manual labelling process 92 allows to tackle this problem:

1. As FIG. 6 shows, a K-means structure 1213 can e.g. be used as clustering structure. In particular, a mini-batch K-means structure 1214 is used to cope with the large numbers of datasets 102 within limited computational resource or to optimize the computational consumption. Further, the elbow method can be used to decide on the number of clusters 1212. FIG. 6 is a plot of the result from the elbow method, where 70 is used as the number of clusters 1212. Further, encoding can e.g. be performed on categorical features, and standardization can e.g. be performed on numerical features. According to the embodiment variant, certain features like the claim disease severity can become very important features, so the system 1 can be realized to put higher weights on them when the distance function is processed during the clustering process.
2. For each of the cluster 1212, the distribution of the common features can be plotted which can be used to trigger the automated risk-transfer systems 6/61, . . . , 6i as basis of the for risk evaluation. This can also be done visually either by plotting some interactive visualizations directly in Jupyter notebooks, or by using other tools like PowerBI or Tableau.
3. Manual labelling of eligible/non-eligible risks by the underwriters on the clusters. There are also cases where it's not clear for certain clusters to be labelled as eligible or non-eligible risk, and those clusters will be labelled as "exclude" so we will not use them as part of our training data.

Figure 7:
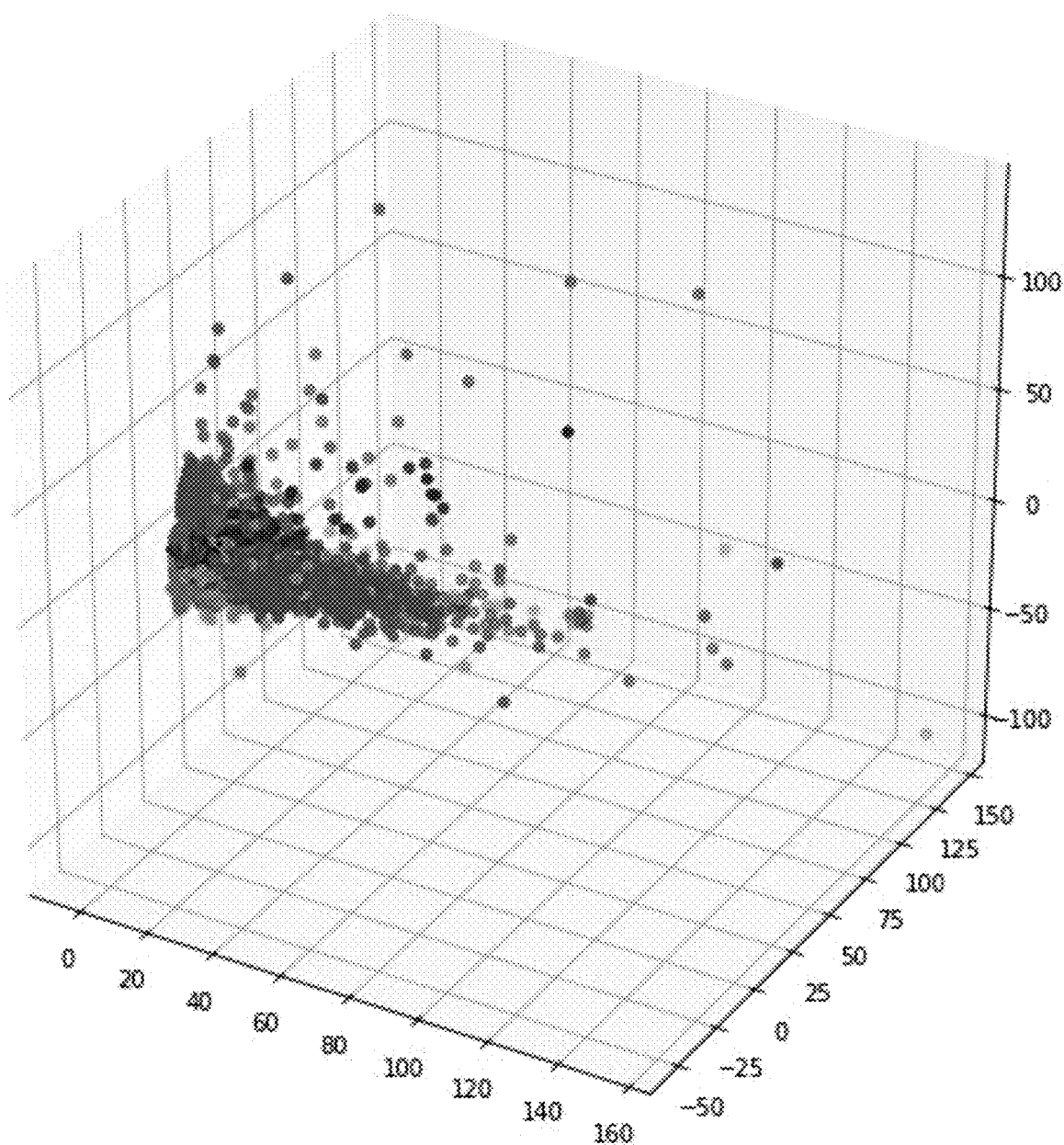
FIG. 7 shows a diagram schematically illustrating a plot to map the high-dimensional data into a 3-dimentional space and show clusters 1212 in different grey-shades. Obviously, this is technically not an easy task to automated separation of the clusters 1212 and many correlations are within the features.
Figure 8:
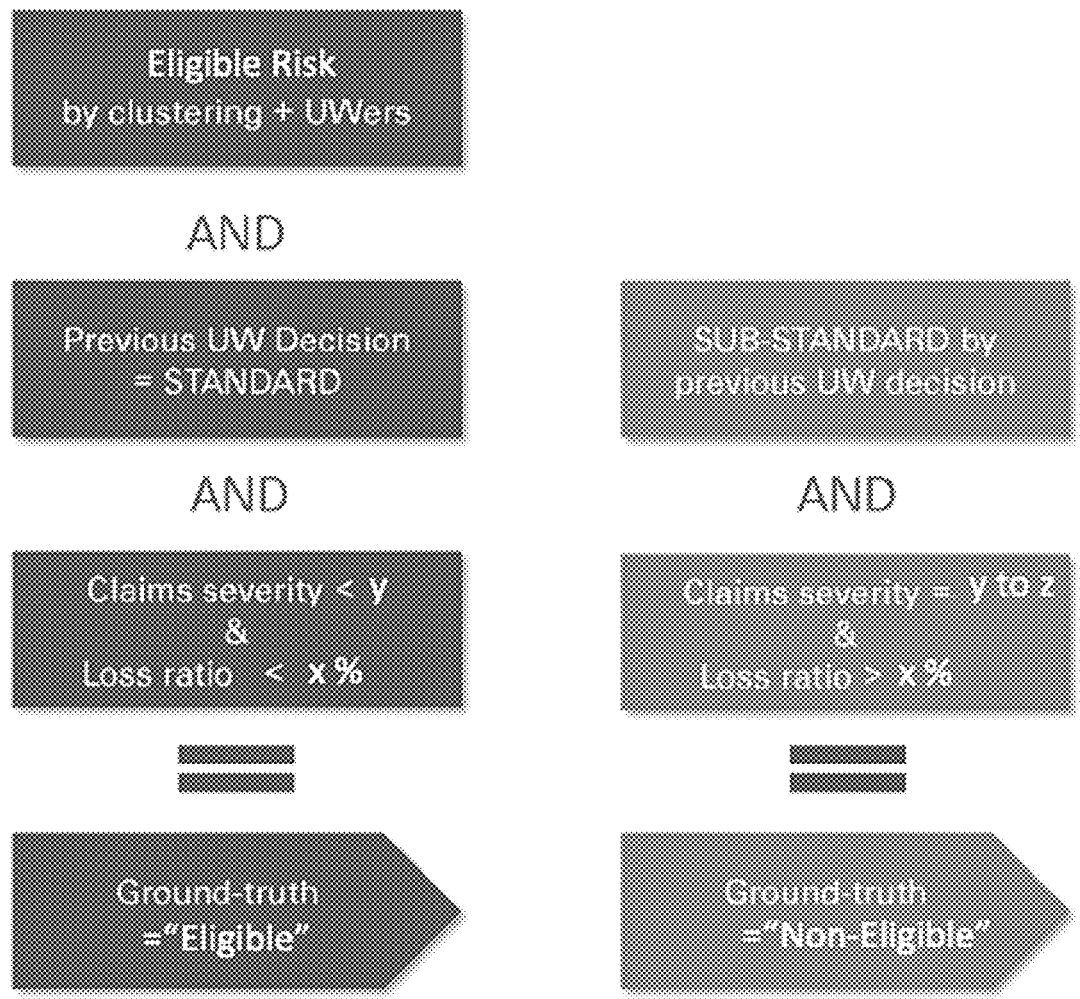
FIG. 8 shows a diagram schematically illustrating, who after the labelling process, each individual 2 in the cluster 1212 will have a cluster label as "Eligible" or "Non-eligible", otherwise assigned as "excluded" and will not be used as training data. This result will be combined/cross-checked with label generated from the rules to get the final "Ground-truth" label of Eligible or Non-eligible risk as illustrated in FIG. 8.

FIG. 7 shows a plot to map the high-dimensional data into a 3-dimentional space and show clusters 1212 in different color. After this process, each individual 2 in the cluster 1212 will have a cluster label as "Eligible" or "non-eligible", otherwise assigned as "excluded" and will not be used as training data. This result will be combined/cross-checked with label generated from the rules to get the final "Ground-truth" label of eligible or non-eligible risk as illustrated in FIG. 8. Note that with this mechanism of generating the ground-truth label, there will be some individuals 2 who get inconsistent labels from the rules and the clustering result, and the system 1 will exclude them from the training datasets 102 by filtering. After filtering with previous UW decision, claims severity and loss ratio, applicable data points are extracted to train the ML-based modeling structure.

Since the data of individuals 2 are usually time dependent data, a data splitting process could be required. Although it is not necessary and many times not appropriate to use time series processing to work on this kind of data, it is still important to be aware of the time dependent nature of it, and process data accordingly. Labelling the risks, having the same time period for features and labels will inevitably result in a structure trying to just imitate the rules. The second way is to divide the time periods for features and labels. Features imitate the "past" evidence and labels indicate the "future" risk. During the training process, features are generated, for example, from January 2014 to October 2017, and labels (with rules and cluster labels) are generated from November 2017 to August 2019. The model can e.g. be trained this way so that it measures/uses the past data to predict risk score measures for the future. Thus, when the modelling prediction structure is processed, all the history data can e.g. be used as the features, and predict the risk scores e.g. for the next 2 years from August 2019. There are also other ways of splitting the data. For example, this split can be customer dependent. The first several years can be used after one policy was bought to generate the labels and use data before this policy purchase as features. Now the system 1 gets the correct features and labels, the system 1 needs to divide the data into training set, validation set, and testing set for the machine learning process. Training set is for training the model itself, validation set is used to monitor the training process to get the best hyperparameters (mostly to avoid over-fitting), and testing set is to finally evaluate the model performance. For example, a rule of thumb 20/80 split can be used for this. 20% of the data is used as testing set, 16% (20% of the left data) is used as validation set, and the rest 64% is used as training set. Once the model hyper-parameters are determined and ready to go to production, the same hyper-parameters can e.g. be used to retrain the model structure on all the data set (100% training set) to gain a few percentages of performance improvement. Again, there are also other ways of splitting data for training and testing purposes. One of them is to again split on the timeline, so that we train a model with the historical data as the training set and test it in the recent one year as the testing set to check its predictive power for the future.

For handling imbalanced dataset 102, it is to be noted that the present system 1 is associated with a binary classification problem on eligible and non-eligible risks. It can be found that the label data is very imbalanced with way more eligible risks than non-eligible risks (ratio around 5:1). One possible way of tackling this is to use techniques like oversampling or undersampling to balance the dataset. However, undersampling will significantly decrease the data volume for eligible risks. Oversampling methods like SMOTE will create some new synthetic data points imitating the non-eligible risks, which may be problematic to use as the synthetic data points are not real cases anyways. For the system 1, changing the weights in the costing function can be used so that it will give a bigger punishment if it mislabels a non-eligible risk. The Gradient Boosted Tree can be used as classification structure, with the famous python package XGBoost. We simply set the parameter "scale_pos_weight" as the ratio between number of eligible risks and number of non-eligible risks to achieve this. AUC is used for evaluation of the model during the training process. One thing to note is that by changing the weight in the costing function, the risk score will not be the accurate "probability" of an eligible risk. However, the ranking of the risk scores is still valid, and it will tune the threshold for GIO and SIO, so it will not be an issue. A grid search can be used to find the best hyperparameters.

Figure 9:
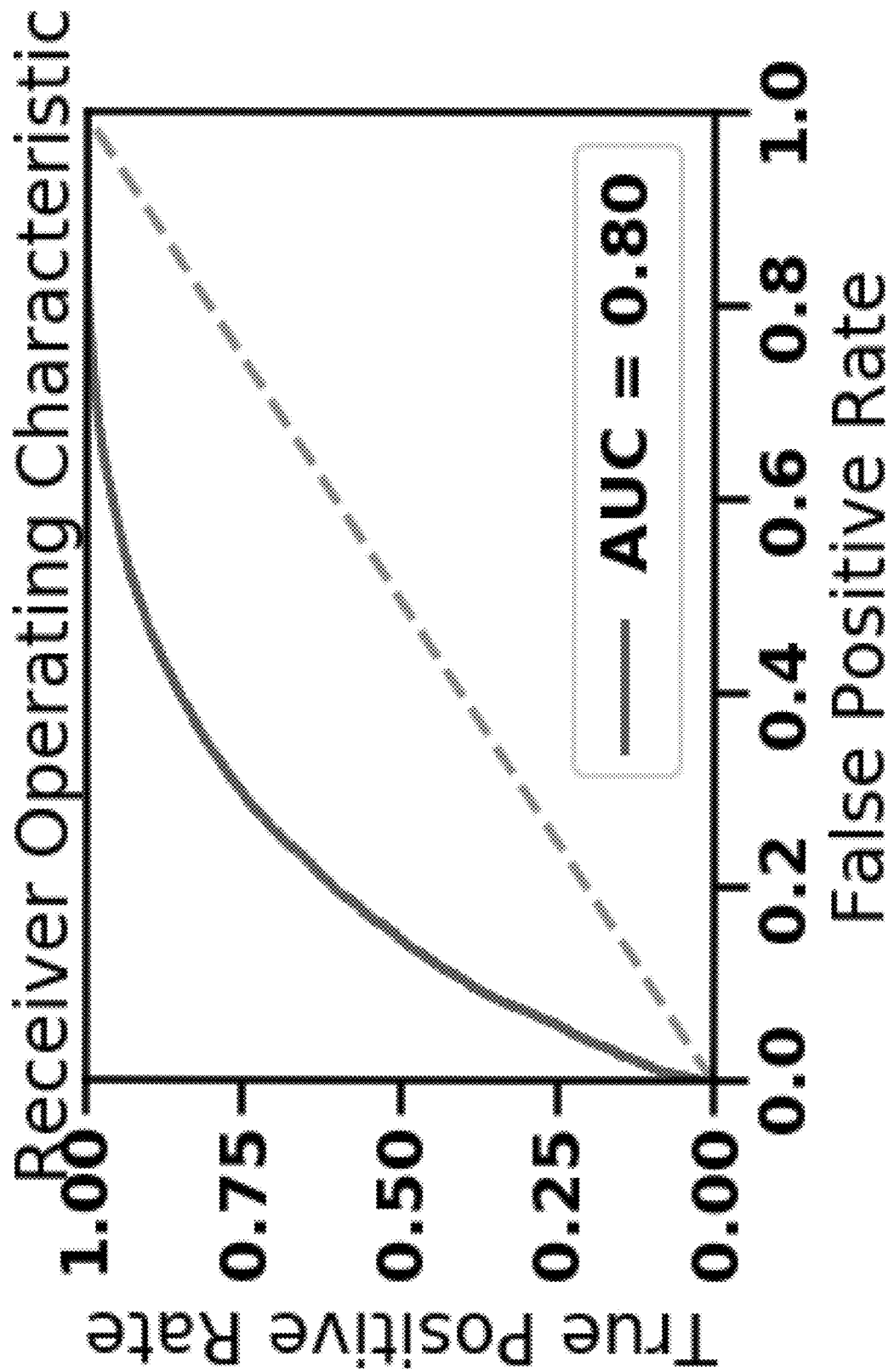
FIG. 9 shows a diagram schematically illustrating that for the present binary classification problem, AUC can be chosen as one of the best ways to generate the model performance. In the present case the AUC is around 0.8, as illustrated by FIG. 9.
Figure 10:
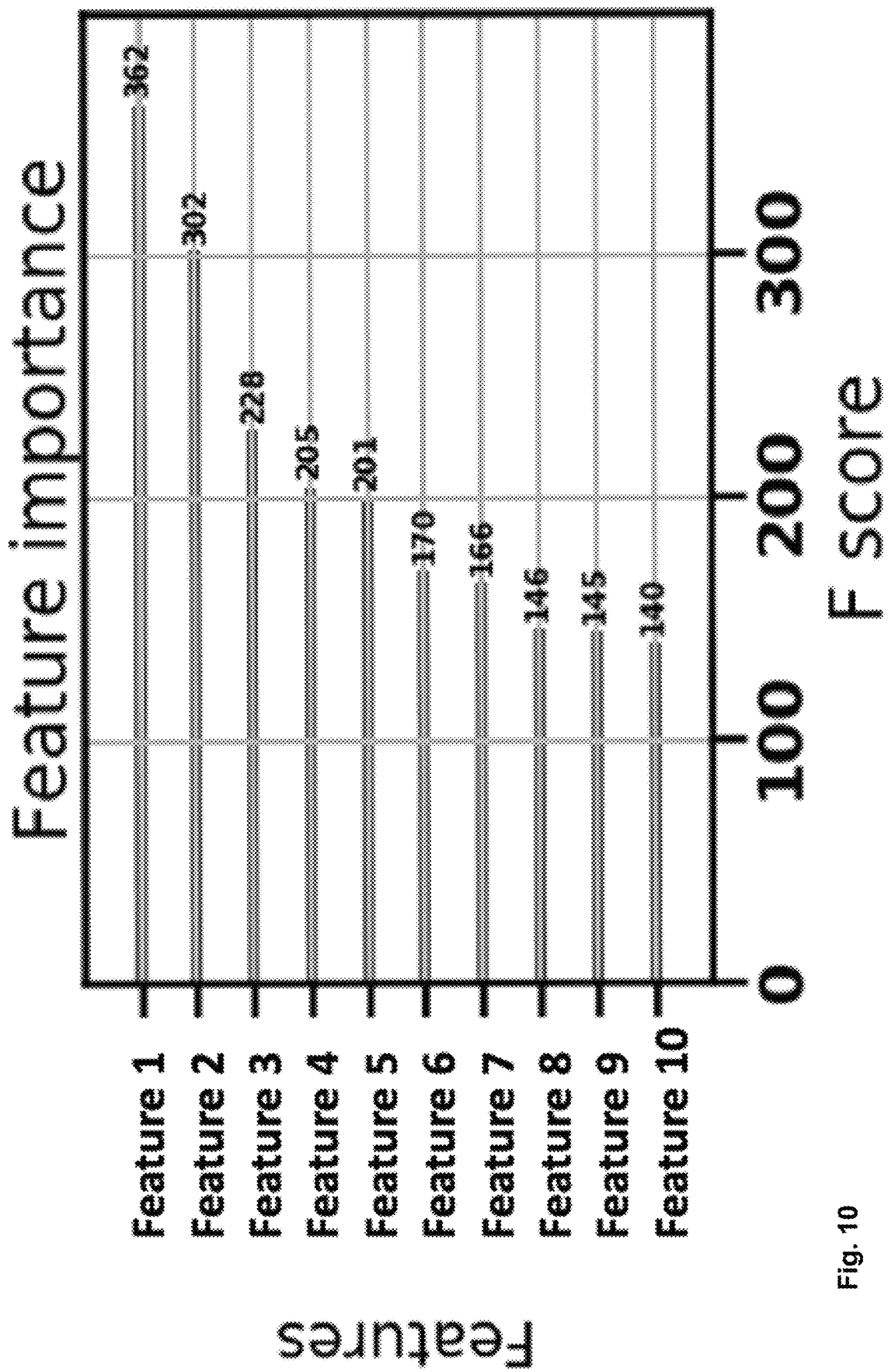
FIG. 10 shows a diagram schematically illustrating that plotting the most important features from the modeling structure. This result is generated by the internal XGBoost function. A further improvement is to use packages like SHAP to get further model interpretation insights.

For the present binary classification problem, AUC can be chosen as one of the best ways to generate the model performance. In the present case the AUC is around 0.8, as illustrated by FIG. 9. FIG. 10 plotted the most important features from the modeling structure. This result is generated by the internal XGBoost function. A further improvement is to use packages like SHAP to get further model interpretation insights. Plotting the confusion matrix for the modeling structure should be done before threshold tuning so the threshold is by default 0.5 for eligible and non-eligible risks. The model performance results after threshold tuning are shown below:

Confusion Matrix on Testing Data for Model 1

| Pred/Label | Eligible Risk | Non-Eligible Risk |
|---|---|---|
| Reject (<0.5) | 19% | 64% |
| SIO (0.5-0.7) | 33% | 22% |
| GIO (>0.7) | 48% | 14% |

| Metrics | Results |
|---|---|
| Precision | 92% |
| Recall | 81% |
| f1 score | 86% |
| Accuracy | 78% |

Two basic metrics can be important: (1) Recall for Non-eligible Risk=TN/(TN+FP). A bad value of this means we mislabel many non-eligible risks as eligible risks and will bring financial risk to business; and (2) Precision for Eligible Risk=TP/(TP+FP). A bad value of this means there will be a lot of missed opportunities. However, to find a balance between these two metrics can be best done during the threshold tuning (as discussed later below).

The ML-based, predictive, digital underwriting system 1 comprises a supervised machine-learning (ML) structure 122 for automated classification and/or validation of datasets of individuals 2 based its associated cluster 1211. The learning phase 1221 of the supervised machine-learning (ML) structure 122 comprises a feedback learning loop 1222 based on classified historical datasets 103 of individuals 2. The extracted clusters or segments 1212 can e.g. be automatically classified by a supervised machine-learning structure 122 or by a pattern recognition module 123 based on historically measured and validated datasets 103. For automated classification and/or validation of datasets of individuals 2, alternatively, the clusters/segments 1212 can e.g. be validated by providing a feedback loop 1222 to at least one human expert based on historically measured and validated datasets 103 by means of the data interface 14 of the system 1. The historically measured and validated datasets 103 can e.g. at least comprise data indicating an underwriting decision 1201 and/or a claim severity 1202 and/or a loss ratio 1203.

The ML-based, predictive, digital underwriting system 1 comprises an artificial-intelligence (AI) module 13 with a supervised machine-learning structure 131 trained during a training phase 1311 by supervised machine-learning. The AI-module 13 generates in the application phase 1312 for each inputted dataset 13121 of an individual 2 a measured risk score value 13122 as the measured occurrence probability value for the occurrence of one or more predefined life, health and/or medical events 4 to the individual 2 assigned to the inputted dataset 13121.

The system 1 is calibrated by a calibration module 132 to or based on a predefined calibration threshold 1321, wherein the measured risk score values 13122 and/or a measured distribution 1322 of the measured risk score values 13122 are adjusted or calibrated to a predefined value range 1323 given by the calibration threshold value 1321. The calibration threshold value 1321 can e.g. be related to or representing a risk appetite associated with a risk-transfer system 6/61, 62, . . . , 6i as maximum value of possibly to be covered risks by a risk-transfer system 6/61, 62, . . . , 6i and/or by a specific portfolio 1011 and/or 6i3 comprising a plurality of selected risk-transfers 101/6i4. A measured performance 6i5 of an automated risk-transfer system 6/61, 62, . . . , 6i can e.g. be automatedly adapted by adjusting and/or calibrating the system 1 and/or the calibration module 132 by measuring a business impact of an error caused by the AI-module 13 to the automated risk-transfer system 6/61, 62, . . . , 6i.

As mentioned, the present system, inter alia, provides an automated predictive underwriting process for signaling and triggering the operation (underwriting and/or coverage/claim processing) of associated automated risk-transfer system 6/61, 62, . . . , 6i. One of the objects, in this respect, is to provide a risk score measure for each associated risk-transfer system 6/61, 62, . . . , 6i. In the signal, those with high score are eligible risks and are eligible for Guaranteed Issued Offer (GIO) for risk-transfers 101/6i4.

Those with lower scores are eligible for Simplified Issued Offer (SIO), with which they need to fill in a simple questionnaire declaring on their past medical history. Those with bad scores will have to go through the full underwriting process which often includes something like a health check. Traditionally such underwriting process needs to be done with a rule-based system developed by underwriters and medical officers. The inventive system has the advantage of (1) Potentially giving more GIO/SIO to customers without additional price loading; (2) Getting more accurate results with historical data; (3) Taking account into more non-traditional features; (4) Being an automated, data-driven, and self-evolving underwriting engine as compared to frequent manual rule updates.

For the present invention, a good environment for realizing the present invention can e.g. comprise a Linux environment (for example Ubuntu) with proper computational resource and internet connection for installing the required packages. It can be either a physical machine or an environment in the cloud. It should also be able to connect to the internal database, so data can be easily manipulated and extracted directly. However, the operating system can be chosen flexible (e.g. a Linux box with open internet connection and root access (for setting up env and communicating with conda/pip/github etc.). The programming structure can e.g. be realized by using Python 3.6, or the like. Many risk-transfer system 6/61, 62, . . . , 6i require very strict policies, for example, that no data can be transferred out of their environment. This issue can e.g. be solved with a secure remote working setup, or with advanced secure machine learning techniques like Federated Learning.

Threshold Tuning can e.g. be performed, once the model structure is built and make the risk score predictions on the potential individual 2 base. First, it is to decide on the threshold for the SIO and GIO offers. Besides getting the balance between potential financial risk and missed business opportunities, the threshold tuning is mainly a back testing on the data to find the sensible threshold for SIO and GIO from a risk-transfer point of view. This analysis is mainly done on the testing data so that the test can imitate what will happen for the real predictions. Important attributes to consider are loss ratio, age distribution, claim experience etc.

In our project, this analysis allows the risk-transfer systems 6 or underwriters a lot of confidence in deploying the inventive predictive modelling system 1, as clearly with the increase of the score the metrics indicate better health and lower risks. The selected threshold also results in 60+% of individuals 2 being offered GIO/SIO. This can be deemed reasonable and with a slight margin, given actual full UW risk-transfers often result in about 80% of cases being standard.

Besides this threshold tuning, also certain levels of risk management can e.g. be included to the GIO/SIO offers to further control the risk including: (i) Entry age/max age: to mitigate against excess risk at the older ages, (ii) Max issue limit: to mitigate against potential for large losses in cases of GIO/SIO offer to a non-eligible risk incorrectly predicted to be a eligible risk, and/or (iii) No GIOSIO offer for juvenile (<11 years old): Due to greater uncertainty in juveniles' health condition development as they progress through the year, because a number of serious illnesses, including genetic conditions, could manifest anywhere in the first 10 years of life.

Figure 11:
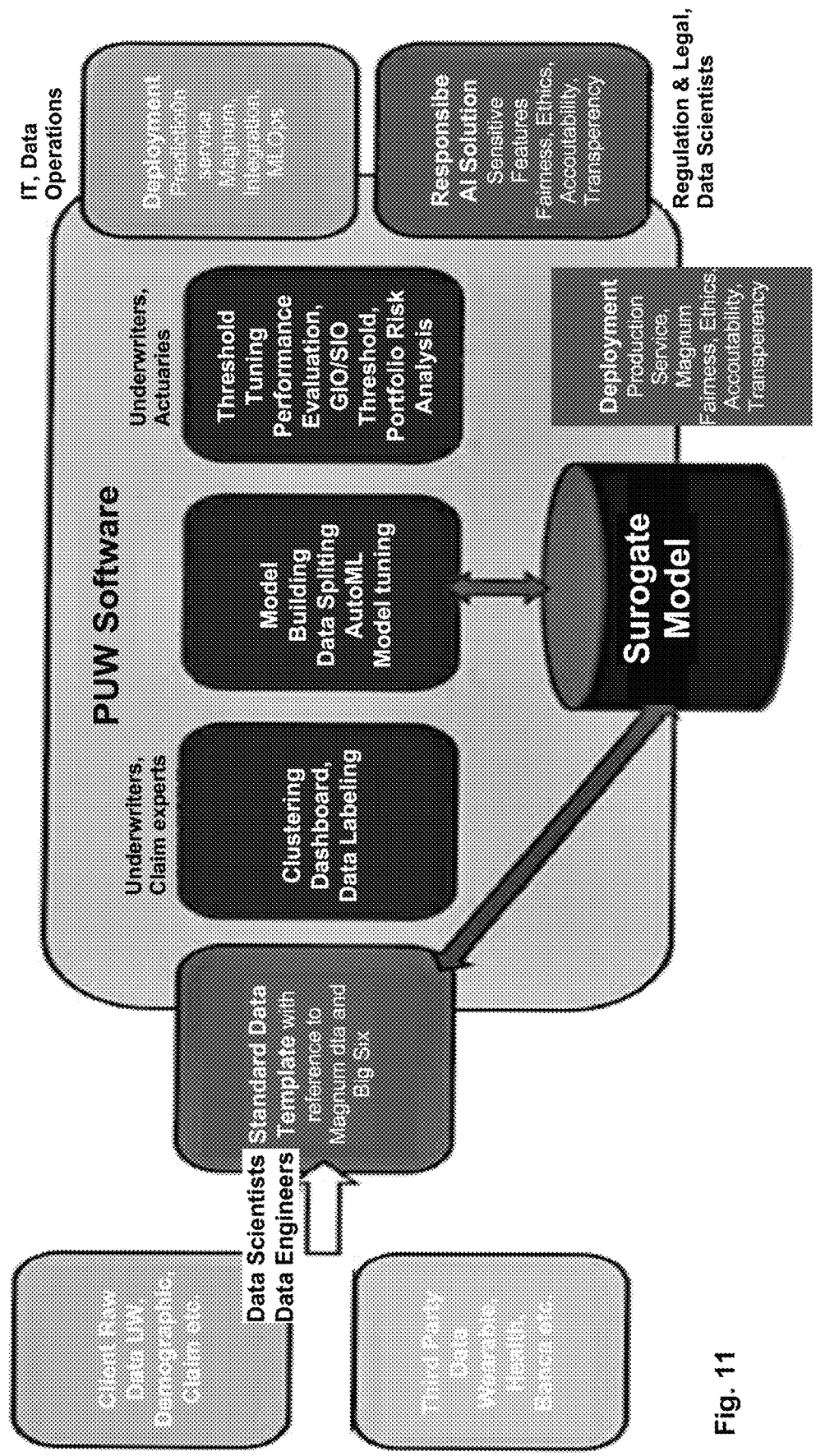
FIG. 11 shows a diagram schematically illustrating a further embodiment variant of the system 1 realized as a scalable Predictive Underwriting (PUW) system. In this embodiment variant, the predictive underwriting structure is scaled so the overhead of deploying it to a new risk-transfer portfolio 6i3 is minimized. The architecture is shown in FIG. 11.
Figure 12:
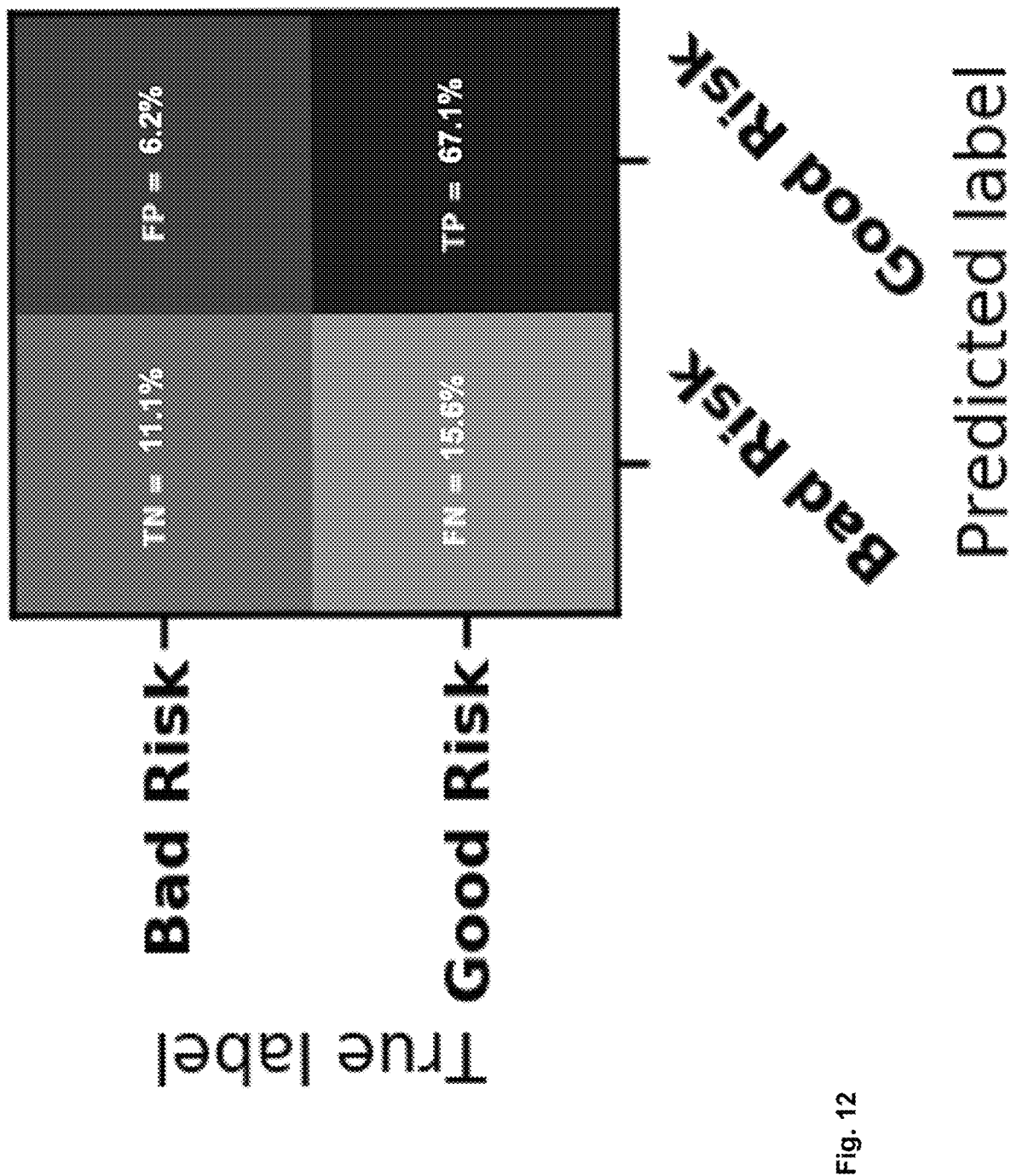
FIG. 12 shows a diagram schematically illustrating a model structure performance assessing/measuring the operational impact of an error caused by the AI-module 13 and/or the system 1. Important metrics are (i) Recall (sensitivity) for non-eligible risk, and (ii) Precision (positive predictive value) for eligible risk.
Figure 13:
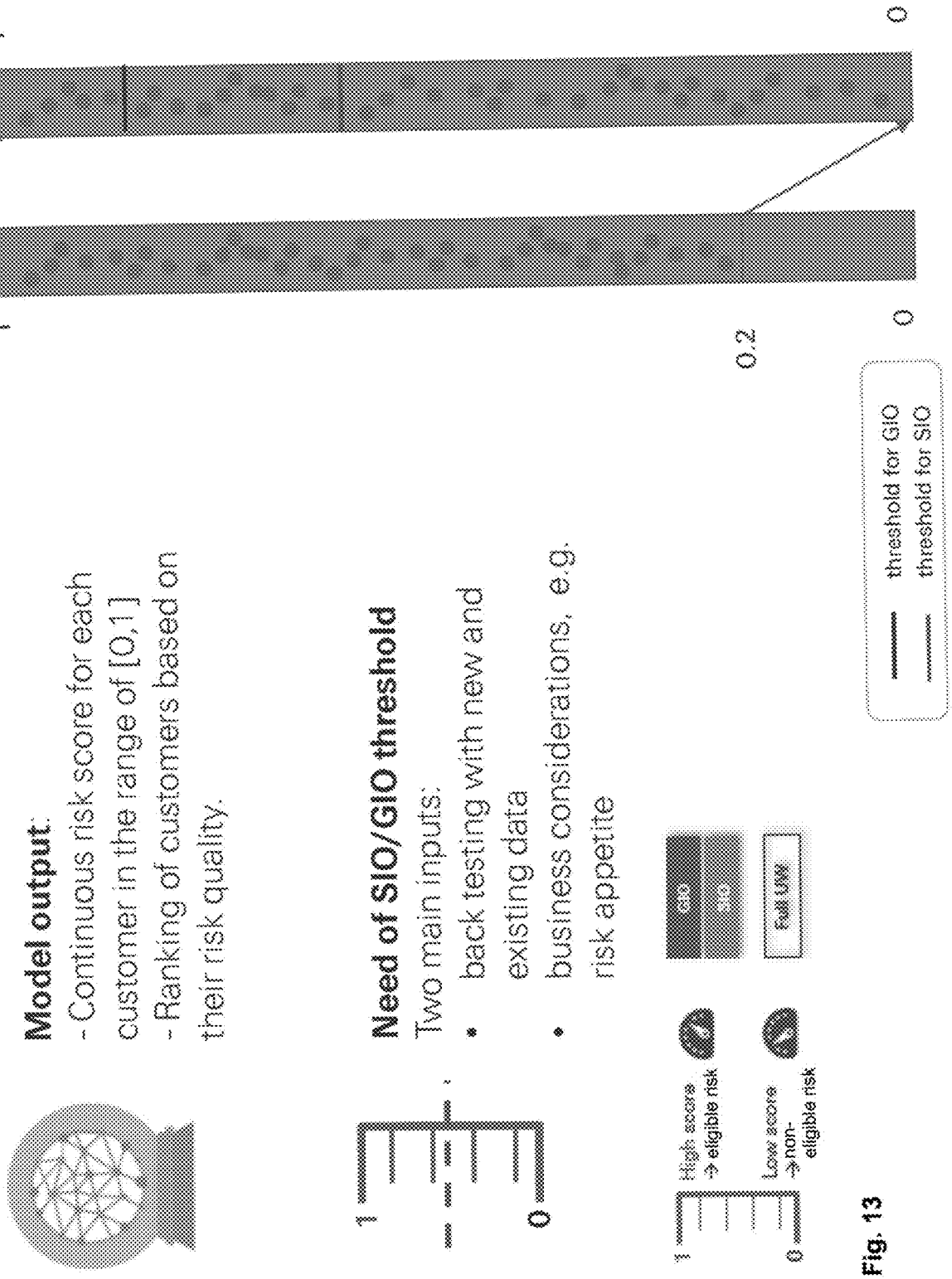
FIG. 13 shows diagram schematically illustrating a calibration process providing an optimized GIO/SIO threshold.
Figure 16:
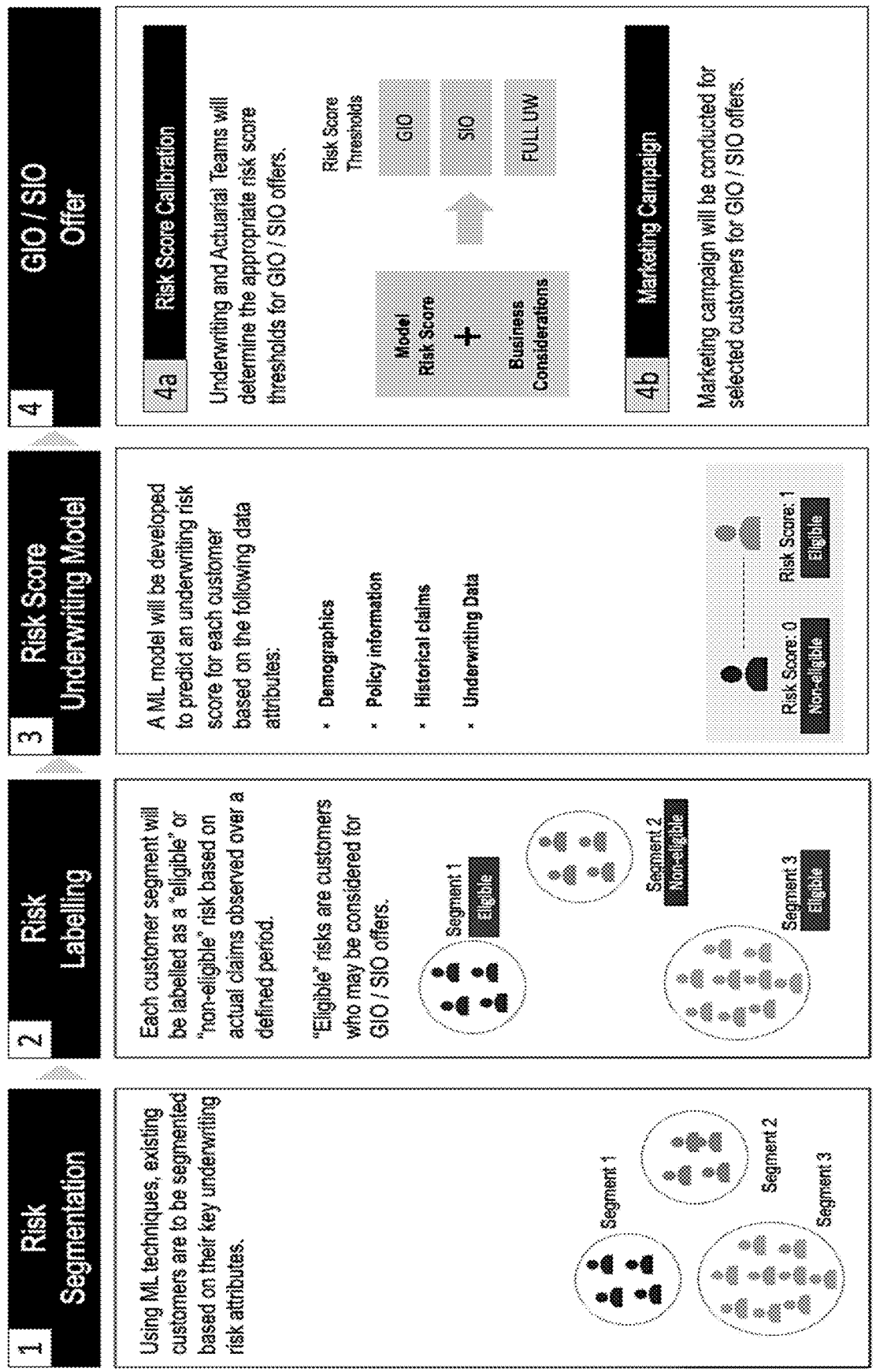
FIG. 16 shows a diagram schematically illustrating an overview of the data processing flow of the inventive system 1.
Figure 17:
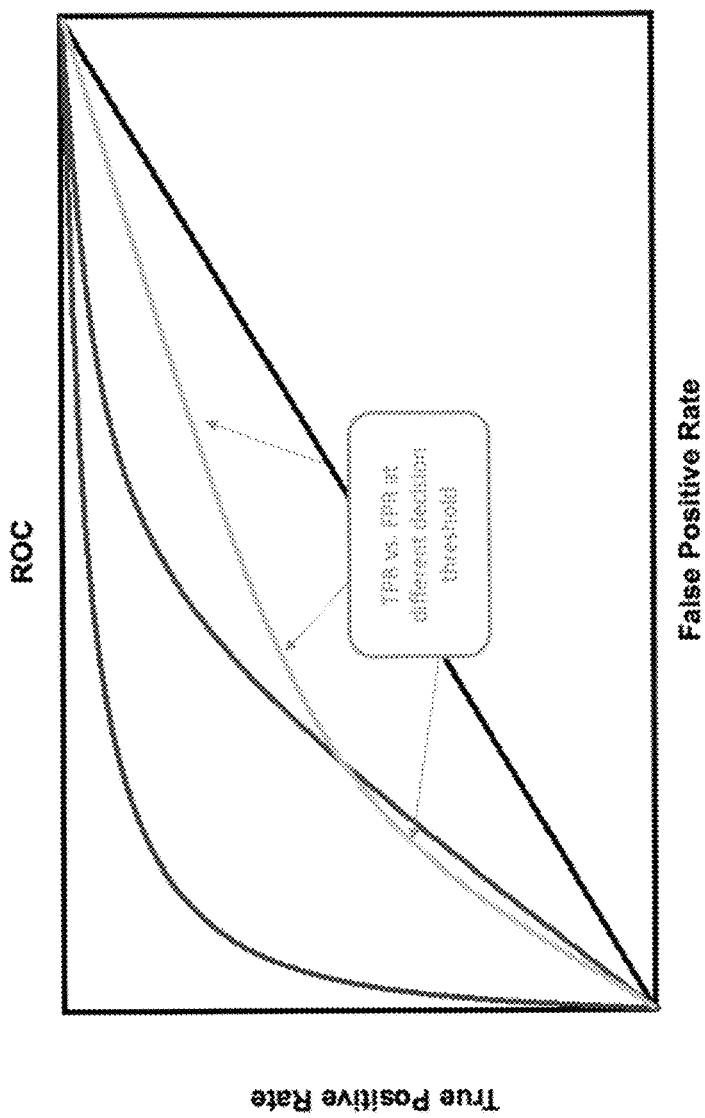
FIG. 17 shows a diagram schematically illustrating an evaluation process. The modeling structure providing the highest AUC can e.g. be selected by the system 1 as a most optimized structure, i.e. True Positive Rate (Recall) is maximized, and False Positive Rate (1-Specificity) are minimized.

As an embodiment variant the system 1 can e.g. be realized as a scalable Predictive Underwriting (PUW) system. In this embodiment variant, the predictive underwriting structure is scaled so the overhead of deploying it to a new risk-transfer portfolio 6i3 is minimized. The architecture is shown in FIG. 11. The scalable predictive underwriting system can e.g. comprise the following key modules: (i) Standard Data Template:Even that the core UW/Demographic/Claim data may be similar across different individuals 2 or risk-transfer system 6, the raw data sources can still be very different especially if the system 1 should be enabled to also include external data sets like banca and wearables etc. Building such an abstract layer of data template will be crucial to generate standard data input for the subsequent PUW software to consume. If there is a new requests for a portfolio of risk-transfers, an important task is to convert the portfolio's raw data into this standard data template instead of building customized PUW modelling code; (ii) PUW Software: This should be the standard software package for building predictive underwriting models that implements most of the process this document has already covered. It is important to note that some Uls need to be developed for underwriters to label the cluster and actuaries to decide on the thresholds etc.; (iii) Surrogate Model: The present system 1 should not only be scalable to different risk-transfer systems 6, but it is also desirable to build stronger modelling along the process. The surrogate model based on the standard data template can e.g. be constantly improved with more and more use cases, and eventually becomes our strong base-line pre-trained model for any further client requests; and (iv) Responsible AI Solution: Working closely with local regulator (Monetary Authority of Singapore) may allow developing systems 1 for evaluating the FEAT principles on AI systems. FEAT refers to Fairness, Ethics, Accountability and Transparency.

LIST OF REFERENCE SIGNS

1 Automated predictive underwriting system
  10 Persistence storage/database
    101 Risk-transfers/risk-covers
      1011, . . . , 101i Portfolio of risk-transfers/risk-covers
    102 Datasets of individuals
      1021 Underwriting decision parameter
      1022 Claim severity parameter
      1023 Loss ratio parameter
      1024 Available duration of measuring time series
    103 Classified historical datasets of individuals
      1031 Underwriting decision parameter
      1032 Claim severity parameter
      1033 Loss ratio parameter
      1034 Available duration of measuring time series
  11 Data pre-processing engine
    111 Preprocessed datasets of individuals
  12 Risk-labelling engine
    121 Unsupervised machine-learning (ML) structure
      1211 Segmented/clustered datasets of individuals
      1212 Clusters/Segments
      1213 K-means machine-learning (ML) structure
        12131 Vector quantization process
        12132 Nearest means
        12133 Cluster center/cluster centroid
      1214 Mini-batch K-means machine-learning (ML) structure
        12141 Small, random, fixed-size batches
      1215 Density-based spatial clustering of applications with noise (DBSCAN) clustering structure
      1216 Outliners
    122 Supervised machine-learning (ML) structure
      1221 Learning phase
      1222 Feedback learning loop
      1223 Application phase
    123 Pattern recognition module
  13 Artificial Intelligence (AI) module
    131 Supervised machine-learning structure
      1311 Training phase
      1312 Application phase
        13121 Input dataset to AI-module
        13122 Measured risk score value (output)
    132 Calibration module
      1321 Predefined calibration threshold
      1322 Distribution of the measured risk score values
      1323 Predefined value range
  14 Data interface
  15 Data sources
    151 Laboratory/clinical/medical measuring devices/sensors
    152 Diagnostic tools
    153 Medical/clinical databases
  16 Signal generator for activation/trigger signaling to auto. systems
2 Risk-exposed Individuals
  21 Cohort of risk-exposed individuals
  22 Occurrence probability (risk) of life, health and/or medical events to an individual with a certain impact strength
  23 Individual characteristic parameters
    231 Demographic characteristics parameters
    232 In-force risk-transfer characteristics parameters
    233 Claims characteristics parameters
    234 UW process characteristics parameters
    235 Extended condition parameters
      2351 Agent channel parameters
      2352 Loyalty program parameters
      2353 Bank transaction parameters
      2354 Wearable telematics parameters
  24 Wearables/Telematic measuring devices associated with individuals
3 Risk-transfers/risk-covers
  Portfolio of risk-transfers
4 Medical and/or health and/or life events
  41 Severity/Impact strength to the individual
  42 Measuring time-window
    421 Past measuring time windows
    422 Future measuring time windows
  43 Medical and/or health and/or life event characteristics parameters
5 Data Transmission Network
  51 Worldwide backbone network (Internet)
6 Automated (risk-transfer) systems
  61, 62, . . . , 6i Automated (risk-transfer) system
    6i1 Network-enabled device of risk-transfer system 6i 6i2 Network interfaces
6i3 Portfolio of risk-transfer system 6i
6i4 Risk-transfer or cover structures of portfolio 6i3
6i5 Performance (risk appetite) of risk-transfer system 6i
    6i51 Cover volume of risk-transfers 6i4
    6i52 Underlying coverage threshold
9 Automated parameter-driven predictive underwriting process
  91 Data capturing/measuring and pre-processing
  92 Risk labelling
    921 Risk segmentation/clustering
    922 Cluster validation
  93 Modelling/Forecasting/Prediction
    931 ML-structure training
    932 ML-structure calibration
  94 Trigger signal generation and transmission to associated automated systems (e.g. warning/alarm/decision making systems)

The invention claimed is:

1. A machine-learning (ML) based, predictive, digital underwriting system providing an automated parameter-driven predictive underwriting process based on measured probability values associated with individuals of a cohort or portfolio, the individuals being exposed to a probability of occurrence of one or more predefined medical and/or health and/or life events having the probability value with a predefined severity within a future measuring time-window, the ML-based, predictive, digital underwriting system comprising:

processing circuitry configured to implement a data pre-processing engine providing pre-processed datasets of individuals measured or captured in a past measuring time window, wherein a plurality of data sources are accessed by means of the data pre-processing engine via a data-interface capturing parameter values to each individual of the cohort or portfolio and assigning the parameter values to a corresponding data set associated with an individual, and wherein the data set at least comprises measuring parameter related to demographic characteristics parameters and/or in-force risk-transfer characteristics parameters and/or claims characteristics parameters and/or UW process characteristics parameters and/or extended condition parameters, wherein the extended condition parameters comprise at least wearable telematics parameters at least comprising log in/out time and/or activities and/or body characteristics data during/between activities and the demographic characteristics parameters comprise at least an occupation class value and/or a height value and/or a weight value and/or a gender value and/or a smoking status value and/or an education indication value and/or a date of birth (DOB) value and/or a race indication value and/or a nationality indication value and/or a marital status value and/or a number of children and/or occupation (sub-) classes level 1 value provided by industry code mapping and/or an issue date and/or an annual income value and/or location value comprising geo-coding data or address data and/or payment frequency and/or payment method indication data, wherein the data sources of the system at least comprise laboratory/clinical/medical measuring devices, the laboratory and/or clinical and/or medical measuring devices and/or sensors at least comprise measuring devices or sensors measuring platelet distribution width and/or mean platelet volume and/or mean red blood cells volume and/or glucose concentration and/or red blood cells and/or monocytes, lymphocytes and/or mean hemoglobin per red blood cell concentration and/or white blood cells and/or platelets and/or creatinine concentration and/or hemoglobin concentration and/or mean hemoglobin per red blood cell and/or red blood cells distribution width and/or hematocrit, and/or neutrophils, wherein the processing circuitry is further configured to implement a risk-labelling engine comprising an unsupervised machine-learning (ML) structure for automated clustering the pre-processed datasets of individuals, the risk-labelling engine providing datasets of individuals segmented by clusters by processing the pre-processed datasets of individuals by the unsupervised machine-learning (ML) structure, wherein the unsupervised machine-learning (ML) structure at least comprise a K-means machine-learning (ML) structure, the K-means machine-learning structure using a vector quantization process partitioning the measured and pre-processed datasets of individuals into a number k of clusters, where each measured and pre-processed dataset of individuals is associated with a cluster having the nearest means to its cluster center or to its cluster centroid serving as a prototype of said cluster, wherein the ML-based, predictive, digital underwriting system comprises a supervised machine-learning (ML) structure for automated classification and/or validation of datasets of individuals segmented by the clusters, wherein the clusters are automatically classified by a supervised machine-learning structure or by a pattern recognition module based on historically measured and validated datasets, and wherein the learning phase of the supervised machine-learning (ML) structure comprises a feedback learning loop based on classified historical datasets of individuals, and wherein the ML-based, predictive, digital underwriting system comprises an artificial-intelligence (AI) module with a supervised machine-learning structure trained during a training phase by supervised machine-learning, the AI-module generating in the application phase for each inputted dataset of an individual a measured risk score value as the measured occurrence probability value for the occurrence of one or more predefined medical and/or health and/or life events to the individual assigned to the inputted dataset.

2. The ML-based, predictive, digital underwriting system according to claim 1, wherein the in-force risk-transfer characteristics parameters comprise at least risk-transfer characteristics parameters and/or contact date and/or time and/or APE (Annual Premium Equivalent) and/or existing UW decision parameters and/or total in-force annualized premium earned (APE) and/or length of relationship and/or last risk-transfer date and/or number of in forced/lapsed risk-transfers.

3. The ML-based, predictive, digital underwriting system according to claim 1, wherein the existing UW decision parameters comprise at least standard UW decision parameters and/or substandard UW decision parameters and/or rejected UW decision parameters and/or exclusion UW decision parameters.

4. The ML-based, predictive, digital underwriting system according to claim 1, wherein the claims characteristics parameters comprise at least an incur data value and/or a settle date value and/or a claim type and/or an amount value and/or a frequency and/or disease diagnosis data and/or IDC-10 code (International Statistical Classification of Diseases and Related Health Problems) and/or diagnosis data associated with a medical and/or health and/or life claim and/or impairment code and/or benefit breakdown data.

5. The ML-based, predictive, digital underwriting system according to claim 1, wherein the UW process characteristics parameters comprise at least a sum value assured and/or a term value of the risk-transfer and/or health characteristics data and/or medical cover parameter and/or past and recent UW decision parameters and/or personal disclosure data.

6. The ML-based, predictive, digital underwriting system according to claim 1, wherein the extended condition parameters comprise at least agent channel parameters and/or loyalty program parameters and/or bank transaction parameters.

7. The ML-based, predictive, digital underwriting system according to claim 6, wherein the agent channel parameters at least comprise agency type and/or agency rating and/or agent area characteristics and/or education level and/or education rank and/or tenure parameters and/or persistence parameters.

8. The ML-based, predictive, digital underwriting system according to claim 6, wherein the loyalty program parameters at least comprise joint data and/or number of activities and/or number reward points earned and/or customer tier parameters.

9. The ML-based, predictive, digital underwriting system according to claim 6, wherein the bank transaction parameters at least comprise credit card transactions parameters and/or standard industry code of merchant.

10. The ML-based, predictive, digital underwriting system according to claim 1, wherein the unsupervised machine-learning (ML) structure further at least comprise a mini-batch K-means machine-learning (ML) structure.

11. The ML-based, predictive, digital underwriting system according to claim 10, wherein, for signal processing, the unsupervised machine-learning (ML) structure is based on a mini-batch K-means structure, the mini-batch K-means structure using small, random, fixed-size batches of the pre-processed dataset of individuals to store in memory, and then collecting with each iteration, a random sample of the pre-processed dataset of individuals used to update the clusters.

12. The ML-based, predictive, digital underwriting system according to claim 11, wherein the mini-batch K-means or K-means machine-learning (ML) structure is realized based on Python.

13. The ML-based, predictive, digital underwriting system according to claim 1, wherein for automated classification and/or validation of datasets of individuals, alternatively, the clusters/segments are validated by providing a feedback loop to at least one human expert based on historically measured and validated datasets by means of the data interface of the system.

14. The ML-based, predictive, digital underwriting system according to claim 12, wherein the historically measured and validated datasets at least comprise data indicating an underwriting decision and/or a claim severity and/or a loss ratio.

15. The ML-based, predictive, digital underwriting system according to claim 1, wherein the system is calibrated by a calibration module to a predefined calibration threshold, wherein the measured risk score values and/or a measured distribution of the measured risk score values are adjusted to a predefined value range given by the calibration threshold value.

16. The ML-based, predictive, digital underwriting system according to claim 15, wherein the calibration threshold value represents a risk appetite associated with a risk-transfer system as maximum value of possibly to be covered risks by a risk-transfer system and/or by a specific portfolio comprising a plurality of selected risk-transfers.

17. The ML-based, predictive, digital underwriting system according to claim 15, wherein a measured performance of an automated risk-transfer system is automatedly adapted by adjusting and/or calibrating the system by measuring a business impact of an error caused by the AI-module to the automated risk-transfer system.

18. The ML-based, predictive, digital underwriting system according to claim 1, wherein the data sources of the system further at least comprise diagnostic tools and/or medical/clinical databases.

19. A method, implemented by processing circuitry of a machine-learning (ML) based, predictive, digital underwriting system providing an automated parameter-driven predictive underwriting process based on measured probability values associated with individuals of a cohort or portfolio, the individuals being exposed to a probability of occurrence of one or more predefined medical and/or health and/or life events having the probability value with a predefined severity within a future measuring time-window, the method comprising:
implementing a data pre-processing engine providing pre-processed datasets of individuals measured or captured in a past measuring time window, wherein a plurality of data sources are accessed by means of the data pre-processing engine via a data-interface capturing parameter values to each individual of the cohort or portfolio and assigning the parameter values to a corresponding data set associated with an individual, and wherein the data set at least comprises measuring parameter related to demographic characteristics parameters and/or in-force risk-transfer characteristics parameters and/or claims characteristics parameters and/or UW process characteristics parameters and/or extended condition parameters, wherein the extended condition parameters comprise at least wearable telematics parameters at least comprising log in/out time and/or activities and/or body characteristics data during/between activities and the demographic characteristics parameters comprise at least an occupation class value and/or a height value and/or a weight value and/or a gender value and/or a smoking status value and/or an education indication value and/or a date of birth (DOB) value and/or a race indication value and/or a nationality indication value and/or a marital status value and/or a number of children and/or occupation (sub-)classes level 1 value provided by industry code mapping and/or an issue date and/or an annual income value and/or location value comprising geo-coding data or address data and/or payment frequency and/or payment method indication data,
wherein the data sources of the system at least comprise laboratory/clinical/medical measuring devices, the laboratory and/or clinical and/or medical measuring devices and/or sensors at least comprise measuring devices or sensors measuring platelet distribution width and/or mean platelet volume and/or mean red blood cells volume and/or glucose concentration and/or red blood cells and/or monocytes, lymphocytes and/or mean hemoglobin per red blood cell concentration and/or white blood cells and/or platelets and/or creatinine concentration and/or hemoglobin concentration and/or mean hemoglobin per red blood cell and/or red blood cells distribution width and/or hematocrit, and/or neutrophils, wherein the method further includes implementing a risk-labelling engine comprising an unsupervised machine-learning (ML) structure for automated clustering the pre-processed datasets of individuals, the risk-labelling engine providing datasets of individuals segmented by clusters by processing the pre-processed datasets of individuals by the unsupervised machine-learning (ML) structure, wherein the unsupervised machine-learning (ML) structure at least comprise a K-means machine-learning (ML) structure, the K-means machine-learning structure using a vector quantization process partitioning the measured and pre-processed datasets of individuals into a number k of clusters, where each measured and pre-processed dataset of individuals is associated with a cluster having the nearest means to its cluster center or to its cluster centroid serving as a prototype of said cluster, wherein the ML-based, predictive, digital underwriting system comprises a supervised machine-learning (ML) structure for automated classification and/or validation of datasets of individuals segmented by the clusters, wherein the clusters are automatically classified by a supervised machine-learning structure or by a pattern recognition module based on historically measured and validated datasets, and wherein the learning phase of the supervised machine-learning (ML) structure comprises a feedback learning loop based on classified historical datasets of individuals, and wherein the ML-based, predictive, digital underwriting system comprises an artificial-intelligence (AI) module with a supervised machine-learning structure trained during a training phase by supervised machine-learning, the AI-module generating in the application phase for each inputted dataset of an individual a measured risk score value as the measured occurrence probability value for the occurrence of one or more predefined medical and/or health and/or life events to the individual assigned to the inputted dataset.

* * * * *